United States Patent
Briggs et al.

(10) Patent No.: US 11,987,506 B2
(45) Date of Patent: May 21, 2024

(54) SALT RECOVERY SOLUTION AND PROCESSES OF USE THEREOF

(71) Applicant: Aquafortus Technologies Limited, Auckland (NZ)

(72) Inventors: Daryl Joseph Briggs, Auckland (NZ); Chaitra Prakash, Auckland (NZ)

(73) Assignee: Aquafortus Technologies Limited, Auckland (NZ)

( * ) Notice: Subject to any disclaimer, the term of this patent is extended or adjusted under 35 U.S.C. 154(b) by 0 days.

(21) Appl. No.: 18/093,263

(22) Filed: Jan. 4, 2023

(65) Prior Publication Data
US 2023/0257284 A1 Aug. 17, 2023

Related U.S. Application Data

(62) Division of application No. 16/753,263, filed as application No. PCT/NZ2018/050135 on Oct. 3, 2018, now abandoned.

(Continued)

(51) Int. Cl.
*B01D 9/00* (2006.01)
*C02F 1/26* (2023.01)
(Continued)

(52) U.S. Cl.
CPC .......... *C02F 1/265* (2013.01); *C02F 2101/10* (2013.01); *C02F 2305/14* (2013.01)

(58) Field of Classification Search
CPC .......... B01D 9/00; B01D 9/0063; B01D 9/02; B01D 11/00; B01D 11/02; B01D 11/0292;
(Continued)

(56) References Cited

U.S. PATENT DOCUMENTS 3,077,500 A * 2/1963 Heinz ............... B01J 31/08
568/388
3,130,156 A 4/1964 Neff
(Continued)

FOREIGN PATENT DOCUMENTS

CA 1208134 A 7/1986
EP 0117870 A1 9/1984
(Continued)

OTHER PUBLICATIONS

Alonso, I., et al., "Thermodynamics of Ketone + Amine Mixtures. Part III. Volumetric and Speed of Sound Data at (293.15, 298.15, and 303.15) K for 2-Butanone + Aniline, + N-Methylaniline, or + Pyridine Systems," J. Chem. Eng. Data, vol. 55: 5400-5405 (2010).
(Continued)

*Primary Examiner* — Allison G Fitzsimmons
(74) *Attorney, Agent, or Firm* — Nelson Mullins Riley & Scarborough LLP; Jane E. Remillard, Esq.; Cynthia L. Kanik

(57) ABSTRACT

The present invention relates to a salt recovery solution and to a process for separating a salt from an aqueous solution. The present disclosure also relates to a salt recovery solution and to its use to concentrate a salt or brine solution by recovering water therefrom. The salt recovery solution suitable for recovering a salt from an aqueous solution comprises at least one tertiary amine containing compound; and at least one enolisable carbonyl.

11 Claims, 6 Drawing Sheets

Related U.S. Application Data

(60) Provisional application No. 62/567,545, filed on Oct. 3, 2017.

(51) Int. Cl.
*C02F 9/00* (2023.01)
*C02F 101/10* (2006.01)

(58) Field of Classification Search
CPC . B01D 11/04; B01D 11/0415; B01D 11/0492; B01D 2239/04; B01D 2257/00; B01D 2257/80; C02F 1/00; C02F 1/24; C02F 1/26; C02F 1/265; C02F 1/52; C02F 1/5272; C02F 1/5281; C02F 1/54; C02F 1/58; C02F 1/68; C02F 2001/5218; C02F 9/00; C02F 2101/00; C02F 2101/30; C02F 2101/10; C02F 2103/00; C02F 2103/08; C02F 2201/00
See application file for complete search history.

(56) References Cited

U.S. PATENT DOCUMENTS

| | | | |
|---|---|---|---|
| 3,164,539 | A | 1/1965 | Smith |
| 5,346,620 | A | 9/1994 | Hendrix et al. |
| 5,705,074 | A | 1/1998 | Brient |
| 6,307,087 | B1 | 10/2001 | Buchwald et al. |
| 6,858,694 | B2 | 2/2005 | Ohnishi et al. |
| 6,858,964 | B2 | 2/2005 | Masumoto et al. |
| 7,560,029 | B2 | 7/2009 | McGinnis |
| 9,630,861 | B2 | 4/2017 | Ikeda et al. |
| 10,933,377 | B2 | 3/2021 | Briggs et al. |
| 11,020,706 | B2 | 6/2021 | Briggs et al. |
| 2002/0156295 | A1 | 10/2002 | Buchwald et al. |
| 2012/0043274 | A1 | 2/2012 | Chi et al. |
| 2013/0240444 | A1 | 9/2013 | Jung et al. |
| 2014/0076810 | A1 | 3/2014 | Jessop et al. |
| 2014/0158621 | A1 | 6/2014 | Lee et al. |
| 2014/0290854 | A1 | 10/2014 | Parellada Llobet et al. |
| 2014/0319056 | A1 | 10/2014 | Fuchigami et al. |
| 2015/0108061 | A1 | 4/2015 | Chi et al. |
| 2015/0166363 | A1 | 6/2015 | Eyal et al. |
| 2015/0273396 | A1 | 10/2015 | Hancock et al. |
| 2015/0360973 | A1 | 12/2015 | Eyal et al. |
| 2016/0023171 | A1 | 1/2016 | Phillip et al. |
| 2016/0158705 | A1 | 6/2016 | Helm et al. |
| 2016/0175777 | A1 | 6/2016 | Ikeda et al. |
| 2017/0354904 | A1 | 12/2017 | Wilson et al. |
| 2018/0015414 | A1 | 1/2018 | Hu et al. |
| 2019/0099718 | A1 | 4/2019 | Briggs et al. |
| 2020/0023316 | A1 | 1/2020 | Briggs |
| 2020/0308023 | A1 | 10/2020 | Briggs et al. |
| 2022/0185754 | A1 | 6/2022 | Briggs et al. |
| 2022/0193608 | A1 | 6/2022 | Briggs |
| 2023/0043356 | A1 | 2/2023 | Prakash et al. |

FOREIGN PATENT DOCUMENTS

| | | |
|---|---|---|
| JP | S5610131 A | 2/1981 |
| WO | 2014089142 A1 | 6/2014 |
| WO | 2016094835 A1 | 6/2016 |
| WO | 2016133464 A1 | 8/2016 |
| WO | 2018067019 A2 | 4/2018 |
| WO | 2019/070134 A2 | 4/2019 |

OTHER PUBLICATIONS

Bahadur Alisha, S. et al., "Ultrasonic Studies on Binary Liquid Mixtures of Triethylamine with Carbitols at 308.15 K," Indian Journal of Advances in Chemical Science, vol. 5(3): 148-154 (2017).

Gonzalez, J-A., et al. "Thermodynamics of ketone + amine mixtures. Part X. Excess molar enthalpies at 298.15 K for N, N, N-triethylamine + 2-alkanone systems. Characterization of tertiary amine + 2-alkanone, and of amino-ketone + n-alkane mixtures in terms of DISQUAC," Fluid Phase Equilibria, vol. 356: 117-125 (2013).

International Preliminary Report on Patentability, PCT/NZ2017/050127, dated Apr. 9, 2019, 6 pages.

International Preliminary Report on Patentability, PCT/NZ2018/050135, dated Apr. 8, 2020, 8 pages.

International Search Report and Written Opinion, PCT/NZ2017/050127, dated Jan. 22, 2019, 8 pages.

International Search Report and Written Opinion, PCT/NZ2018/050135, dated Nov. 14, 2019, 11 pages.

Reddy, K.C. et al., "Ultrasonic Behaviour of Binary Liquid Mixtures Containing Trie thy lamine, Part 1," Trans. Faraday Soc., vol. 58: 2352-2357 (1962).

U.S. Appl. No. 16/753,263, filed Apr. 2, 2020, Daryl Joseph Briggs, US 2020030823.

U.S. Appl. No. 17/436,439, filed Sep. 3, 2021, Daryl Joseph Briggs, US 20220185754.

U.S. Appl. No. 17/599,284, filed Sep. 28, 2021, Chaitra Prakash, US 20230043356.

U.S. Appl. No. 16/145,968, filed Sep. 28, 2018, Daryl Joseph Briggs, U.S. Pat. No. 10,933,377.

\* cited by examiner

SALT RECOVERY SOLUTION AND PROCESSES OF USE THEREOF

CROSS-REFERENCE TO RELATED APPLICATIONS

This application is a divisional of U.S. patent application Ser. No. 16/753,263, filed Apr. 2, 2020, which is a 35 U.S.C. § 371 national stage filing of International Application No. PCT/NZ2018/050135, filed Oct. 3, 2018, which claims priority to U.S. Provisional Application No. 62/567,545, filed Oct. 3, 2017. The contents of the aforementioned applications are hereby incorporated by reference in their entirety.

FIELD OF THE INVENTION

The present disclosure relates to a salt recovery solution and to a process for separating a salt from an aqueous solution. The present disclosure also relates to a salt recovery solution and to its use to concentrate a salt or brine solution by recovering water therefrom.

BACKGROUND OF THE INVENTION

The extraction of salts from an aqueous solution is typically a high energy and time consuming process, requiring removal of water and salt crystallisation. As reported in 2016 by Tong et al. American Chemical Society 6846 DOI: 10.1021/acs.est.6b01000 Environ. Sci. Technol. 2016, 50, 6846-6855, Zero liquid discharge (ZLD) is an ambitious wastewater management strategy that eliminates any liquid waste leaving the plant or facility boundary, with the majority of water being recovered for reuse. Achieving ZLD, however, is generally characterized by intensive use of energy and high cost. As a result, ZLD has long been considered technically but not economically viable and has been applied only in limited cases. In recent years, greater recognition of the dual challenges of water scarcity and pollution of aquatic environments has revived global interest in ZLD. More stringent regulations, rising expenses for wastewater disposal, and increasing value of freshwater are driving ZLD to become a beneficial or even a necessary option for wastewater management. The global market for ZLD is estimated to reach an annual investment of at least $100-200 million spreading rapidly from developed countries in North America and Europe to emerging economies such as China and India. Early ZLD systems were based on stand-alone thermal processes, where wastewater was typically evaporated in a brine concentrator followed by a brine crystallizer or an evaporation pond. The condensed distillate water in ZLD systems is collected for reuse, while the produced solids are either sent to a landfill or recovered as valuable salt by-products. Such systems, which have been in successful operation for 40 years and are still being built, require considerable energy and capital. Reverse osmosis (RO), a membrane-based technology widely applied in desalination, has been incorporated into ZLD systems to improve energy and cost efficiencies. However, RO, although much more energy efficient than thermal evaporation, can be applied only to feedwaters with a limited salinity range. Accordingly, other salt-concentrating technologies that can treat higher salinity feedwaters, such as electrodialysis (ED), forward osmosis (FO), and membrane distillation (MD), have emerged recently as alternative ZLD technologies to further concentrate wastewater beyond RO. Although ZLD holds great promise to reduce water pollution and augment water supply, its viability is determined by a balance among the benefits associated with ZLD, energy consumption, and capital/operation costs.

It is an object of the present invention to provide a solution that overcomes these difficulties or to at least provide a useful alternative.

SUMMARY OF THE INVENTION

In a first aspect, the present invention provides a salt recovery solution suitable for recovering a salt from a first aqueous solution, the salt recovery solution comprising:
a) at least one tertiary amine containing compound; and
b) at least one enolisable carbonyl.

In one embodiment the salt recovery solution comprises:
a) at least one tertiary amine containing compound; and
b) at least one enolisable carbonyl of Formula I,

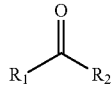

Formula I wherein
c) $R_1$ and $R_2$ are independently selected from a —$C_1$-$C_7$ alkyl or a —$C_3$-$C_7$ monocyclic; or
d) one of $R_1$ or $R_2$ is selected from a —O—($C_1$-$C_7$ alkyl) and the other is selected from a —$C_1$-$C_7$ alkyl, or
e) $R_1$ and $R_2$ together, with the carbonyl of Formula I, form a 3-15 membered monocyclic ketone or a 3-15 membered monocyclic heterocyclic ketone.

In one embodiment, the salt recovery solution comprises:
a) at least one tertiary amine containing compound; and
b) at least one enolisable carbonyl of Formula I,

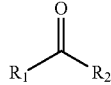

Formula I wherein
$R_1$ and $R_2$ together with the carbonyl of Formula I form an 8-15 membered aromatic system optionally including one or more heteroatoms selected from S, N or O.

In another embodiment the salt recovery solution comprises at least one enolisable carbonyl of Formula I,

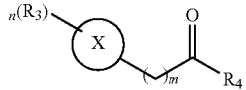

Formula II wherein X is a 5-8 membered aromatic monocyclic optionally containing a heteroatom selected from S, N or O;
each $R_3$, if present, is selected independently from a halo, a hydroxy, a —$NO_2$, a $C_1$-$C_7$ alkyl, or a —O—($C_1$-$C_7$ alkyl);
$R_4$ is selected from a halo, a —O—($C_1$-$C_7$ alkyl); a $C_1$-$C_7$ alkyl optionally substituted with a halo, a hydroxy, a —O—($C_1$-$C_7$ alkyl) or a $C_3$-$C_7$ monocyclic; or a $C_3$-$C_7$ monocyclic optionally substituted with a halo, a hydroxy, a $C_1$-$C_7$ alkyl, or a —O—($C_1$-$C_7$ alkyl);

m is 0, 1, 2 or 3 carbons, each carbon being optionally substituted with one or more substituents selected from a halo, hydroxy, a $C_1$-$C_7$ alkyl optionally substituted with a halo or a hydroxy; a $C_1$-$C_7$ alkyl, a —O—($C_1$-$C_7$ alkyl) or a $C_3$-$C_7$ monocyclic; and n is 0, 1, 2 or 3.

In one embodiment, X is a 6-membered aromatic monocyclic.

In one embodiment $R_4$ is a $C_1$-$C_7$ alkyl optionally substituted with a halo, a hydroxy, a —O—($C_1$-$C_7$ alkyl) or a $C_3$-$C_7$ monocyclic.

In one embodiment the enolisable carbonyl of Formula I is selected from acetophenone and 4-phenyl-2butanone.

In another aspect, the present invention provides a process for recovering a salt from a first aqueous solution, the process including the step of (a) adding the salt containing first aqueous solution to a salt recovery solution; and (b) allowing the salt to precipitate on passage through the salt recovery solution.

In one embodiment the process is a zero-liquid discharge process.

Wherein the process is a non-membrane process.

Wherein the process is a non-osmotic process.

Wherein use of the salt recovery solution is in a non-membrane and non-osmotic process.

In another aspect, the present invention provides a process for concentrating a salt containing first aqueous solution, the process comprising the steps of:

(a) adding the salt containing first aqueous solution to a salt recovery solution as defined above; and (b) allowing water from the salt containing aqueous solution to pass into the salt recovery solution.

In one embodiment the precipitated salt forms part of an aqueous layer distinct from the salt recovery solution.

In one embodiment the process is a non-membrane process.

In one embodiment the process is a non-osmotic process.

In one embodiment the process is a non-membrane and non-osmotic process.

In one embodiment the process concentrates the first aqueous solution by at least 20%. In other embodiments the process concentrates the first aqueous solution by at least 30%, or by at least 40%, or by at least 50% or by at least 60%, or by at least 70% or by at least 80% or by at least 90%.

In one embodiment the process is a minimal discharge process.

In one embodiment the process is a zero-liquid discharge process.

The foregoing brief summary broadly describes the features and technical advantages of certain embodiments of the present invention. Further technical advantages will be described in the detailed description of the invention and examples that follows.

Novel features that are believed to be characteristic of the invention will be better understood from the detailed description of the invention when considered in connection with any accompanying figures and examples. However, the figures and examples provided herein are intended to help illustrate the invention or assist with developing an understanding of the invention, and are not intended to limit the invention's scope.

DETAILED DESCRIPTION OF THE INVENTION

Figure 1:
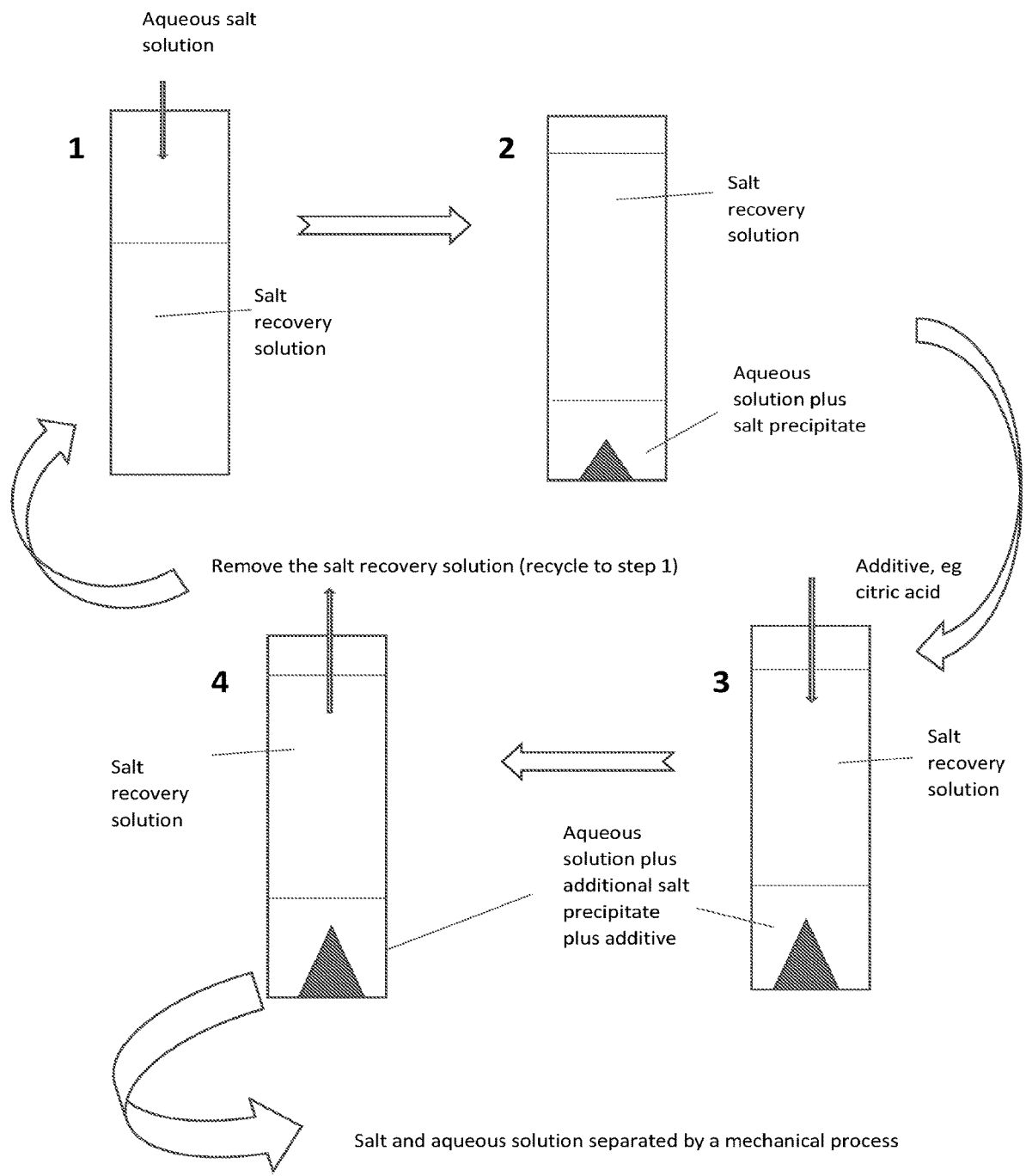
FIG. 1: shows schematically a salt recovery process of the present invention.

The following description sets forth numerous exemplary configurations, parameters, and the like. It should be recognised, however, that such description is not intended as a limitation on the scope of the present invention, but is instead provided as a description of exemplary embodiments.

Definitions

In each instance herein, in descriptions, embodiments, and examples of the present invention, the terms "comprising", "including", etc., are to be read expansively, without limitation. Thus, unless the context clearly requires otherwise, throughout the description and the claims, the words "comprise", "comprising", and the like are to be construed in an inclusive sense as to opposed to an exclusive sense, that is to say in the sense of "including but not limited to".

The term "about" or "approximately" usually means within 20%, more preferably within 10%, and most preferably still within 5% of a given value or range. Alternatively, the term "about" means within a log (i.e., an order of magnitude) preferably within a factor of two of a given value.

The term "additive" as used herein means an additive that releases water held within the salt recovery solution. A non-limiting example of a suitable additive that has been shown to release water bound within the salt recovery solution is citric acid or a citric acid solution. Throughout the specification, the word "regenerant" is also used interchangeably with the work "additive". This is because the additive regenerates the salt recovery solution.

The term "minimal discharge" as used herein, means a salt water or brine treatment process where minimal effluent or discharge is left over.

The term "brine" or "brine solution" as used throughout the specification means an aqueous solution having a concentration of a salt in the water. The salt in the water could include sodium chloride, however, other salt solutions are envisaged, including ammonium sulfate or the like. The concentration of the salt in the aqueous solution may range from about 3.5% (typical concentration of seawater) through to much higher concentrations, such as 25%, which would include a salt water solution used for brining foods. Other brine waste water solutions from textile processing, the semiconductor industry or oil and gas industry would also be applicable for use with the current salt recovery solution and processes defined herein.

As used herein, the term zero liquid discharge, as used throughout the specification, means a wastewater treatment process where no effluent, or discharge, is left over.

As used herein, the term "$C_1$-$C_7$ alkyl" refers to a fully saturated branched or unbranched hydrocarbon moiety, which may be a straight or a branched chain of a particular range of 1-7 carbons. Preferably the alkyl comprises 1 to 7 carbon atoms, or 1 to 4 carbon atoms. Representative examples of $C_1$-$C_7$alkyl include, but are not limited to, methyl, ethyl, n-propyl, isopropyl, n-butyl, sec-butyl, isobutyl, tert-butyl, n-pentyl, isopentyl, neopentyl, n-hexyl, 3-methylhexyl, 2,2-dimethylpentyl, 2,3-dimethylpentyl, n-heptyl, and the like. For example, the expression $C_1$-$C_4$-alkyl includes, but is not limited to, methyl, ethyl, propyl, butyl, isopropyl, tert-butyl and isobutyl. In one embodiment the $C_1$-$C_7$ alkyl group may be substituted with one or more of the following groups: -halo, —OH, —CN, —NO$_2$, —C≡CH, —SH, —$C_1$-$C_7$ alkyl, —($C_1$-$C_7$ alkyl)-OH, —NH$_2$, —NH($C_1$-$C_7$ alkyl), —N($C_1$-$C_7$ alkyl)$_2$, —O($C_1$-$C_7$ alkyl), —C(O)—O(—$C_1$-$C_7$ alkyl), —C(O)OH; —C(O)—H, or —C(O)—($C_1$-$C_7$ alkyl).

The term "$C_3$-$C_7$ monocyclic" as used herein is a 3-, 4-, 5-, 6-, or 7-membered saturated or unsaturated monocyclic ring. Representative $C_3$-$C_7$ monocyclic groups include, but are not limited to, cyclopropyl, cyclobutyl, cyclopentyl, cyclohexyl, phenyl, and cycloheptyl. In one embodiment, the $C_3$-$C_7$ monocyclic cycloalkyl group may be substituted with one or more of the following groups: -halo, —OH, —CN, —NO$_2$, —C≡CH, —SH, —$C_1$-$C_7$ alkyl, —($C_1$-$C_7$ alkyl)-OH, —NH$_2$, —NH($C_1$-$C_7$ alkyl), —N($C_1$-$C_7$ alkyl)$_2$, —O($C_1$-$C_7$ alkyl), —C(O)—O(—$C_1$-$C_7$ alkyl), —C(O)OH; —C(O)—H, or —C(O)—($C_1$-$C_7$ alkyl).

The term "3- to 15-membered monocyclic ketone" refers to a 3- to 15-membered non-aromatic monocyclic ring system containing a ketone functional group. Representative examples of a 3- to 15-membered monocyclic ketone include, but are not limited to cyclopropanone, cyclobutanone, cyclopentanone, cyclohexanone, cycloheptanone, cyclooctanone, cyclononanone, cyclodecanone, cycloundecanone, cyclododecanone, cyclotridecanone; cyclotetradecanone and cyclopentadecanone.

In one embodiment, the 3- to 15-membered monocyclic ketone may be substituted with one or more of the following groups-halo, —OH, —CN, —NO$_2$, —C≡CH, —SH, —$C_1$-$C_7$ alkyl, —($C_1$-$C_7$ alkyl)-OH, —NH$_2$, —NH($C_1$-$C_7$ alkyl), —N($C_1$-$C_7$ alkyl)$_2$, —O($C_1$-$C_7$ alkyl), —C(O)—O(—$C_1$-$C_7$ alkyl), —C(O)OH; —C(O)—H, or —C(O)—($C_1$-$C_7$ alkyl).

The term "8-15 membered aromatic system optionally including one or more heteroatoms selected from S, N or O" of Formula I includes naphthaleneone, fluorenone, quinolinone and indanone ring systems, optionally substituted with halo, hydroxy, nitro, —SH, —$C_1$-$C_7$ alkyl and —O($C_1$-$C_7$ alkyl). Representative examples of such compounds of Formula I include, without limitation napthalenone,2,2,4-trichloro-1(2h)-naphthalenone,4-methyl-1h-naphthalen-2-one, 9-fluorenone, 9-fluorenone oxime,2-nitro-9-fluorenone, 3-nitro-9-fluorenone, 4-nitro-9-fluorenone, 2,6-dinitro-9-fluorenone,2,7-dinitro-9-fluorenone,2,3,7-trinitro-9-fluorenone, 2-fluoro-9-fluorenone, 1-bromo-9-fluorenone, 2-bromo-9-fluorenone, 2,7-dichloro-9-fluorenone, 2,7-dibromo-9-fluorenone, 2-hydroxy-9-fluorenone, 4-hydroxy-9-fluorenone, 1-methylfluoren-9-one, 4-methylfluoren-9-one 11-benzo(a)fluorenone, benzo(b)fluorenone, 1h-benzo(a) fluoren-1-one, 3,4-dihydro-2(1h)-quinolinone, 7-hydroxy-3, 4-dihydro-2(1h)-quinolinone, 6-hydroxy-3,4-dihydro-2 (1h)-quinolinone, 3-butyl-4-hydroxy-1-methyl-2(1h)-quinolinone, 8-bromo-2,3-dihydro-4(1h)-quinolinone, 6-fluoro-4,4-dimethyl-3,4-dihydro-2(1h)-quinolinone, 8-fluoro-4,4-dimethyl-3,4-dihydro-2(1h)-quinolinone, 2,6-dimethyl-4(1h)-quinolinone and 3-butyl-4-hydroxy-1-methyl-2(1h)-quinolinone 1-indanone,5,6-dimethoxy-1-indanone, 6-bromo-1-indanone, 6-methoxy-1-indanone, 2-bromo-1-indanone, 4-bromo-1-indanone, 5-bromo-1-indanone, 5-chloro-1-indanone, 6-chloro-1-indanone, 4,7-dimethyl-1-indanone, 2-methyl-1-indanone, 4-methyl-1-indanone, 5-fluoro-1-indanone, 6-fluoro-1-indanone, 6-(trifluoromethyl)-1-indanone, 4-methoxy-1-indanone, 3,5-dimethoxy-1-indanone, 4,7-dimethoxy-1-indanone, 5-hydroxy-1-indanone, 4-hydroxy-1-indanone, 7-hydroxy-1-indanone, 2-indanone oxime and 2,2-di(methylthio)-1-indanone.

The term "5-8 membered aromatic monocyclic optionally containing a heteroatom" includes without limitation 5-membered rings such as pyrrolyl, furanyl, thiophenyl; 6-membered rings such as phenyl, pyridinyl, pyranyl, thippyranyl and 7-membered rings such as azepinyl, oxepinyl, thiepinyl.

The term "3- to 15-membered monocyclic heterocyclic ketone" refers to: (i) a 3- or 4-membered non-aromatic monocyclic cycloalkyl in which 1 of the ring carbon atoms has been replaced with an N, O or S atom; or (ii) a 5- to 15-membered non-aromatic monocyclic cycloalkyl in which 1-4 of the ring carbon atoms have been independently replaced with a N, O or S atom. Representative examples of a 3- to 15-membered monocyclic heterocyclic ketone having one N, O or S atom include, but are not limited to oxiran-2-one, thiiran-2-one, oxetan-2-one, oxetan-3-one, azetidin-3-one, thietan-2-one, thietan-3-one, dihydrofuran-2(3H)-one, dihydrofuran-3(2H)-one, pyrrolidin-3-one, dihydrothiophen-3(2H)-one, dihydrothiophen-2(3H)-one, tetrahydro-2H-pyran-2-one, dihydro-2H-pyran-3(4H)-one, dihydro-2H-pyran-4(3H)-one, piperidin-3-one, piperidin-4-one, tetrahydro-2H-thiopyran-2-one, dihydro-2H-thiopyran-3(4H)-one, dihydro-2H-thiopyran-4(3H)-one, oxepan-2-one, oxepan-3-one, oxepan-4-one, thiepan-2-one, thiepan-3-one, thiepan-4-one, azepan-3-one, azepan-4-one, oxocan-2-one, oxocan-3-one, oxocan-4-one, oxocan-5-one, thiocan-2-one, thiocan-3-one, thiocan-4-one, thiocan-5-one, azocan-3-one, azocan-3-one, azocan-4-one, azocan-5-one, azonan-3-one, azonan-4-one, azonan-5-one, oxonan-2-one, oxonan-3-one, oxonan-4-one, oxonan-5-one, thionan-2-one, thionan-3-one, thionan-4-one, thionan-5-one, oxacycloundecan-2-one, oxacycloundecan-3-one, oxacycloundecan-4-one, oxacycloundecan-5-one, oxacycloundecan-6-one, azacycloundecan-3-one, azacycloundecan-4-one, azacycloundecan-5-one, azacycloundecan-6-one, thiacycloundecan-2-one, thiacycloundecan-3-one, thiacycloundecan-4-one, thiacycloundecan-5-one, thiacycloundecan-6-one, oxacyclododecan-2-one, oxacyclododecan-3-one, oxacyclododecan-4-one, oxacyclododecan-5-one, oxacyclododecan-6-one, oxacyclododecan-7-one, azacyclododecan-3-one, azacyclododecan-4-one, azacyclododecan-5-one, azacyclododecan-6-one, azacyclododecan-7-one, thiacyclododecan-2-one, thiacyclododecan-3-one, thiacyclododecan-4-one, thiacyclododecan-5-one, thiacyclododecan-6-one, thiacyclododecan-7-one, oxacyclotridecan-2-one, oxacyclotridecan-3-one, oxacyclotridecan-4-one, oxacyclotridecan-5-one, oxacyclotridecan-6-one, oxacyclotridecan-7-one, azacyclotridecan-3-one, azacyclotridecan-4-one, azacyclotridecan-5-one, azacyclotridecan-6-one, azacyclotridecan-7-one, thiacyclotridecan-2-one, thiacyclotridecan-3-one, thiacyclotridecan-4-one, thiacyclotridecan-5-one, thiacyclotridecan-6-one, thiacyclotridecan-7-one, oxacyclotetradecan-2-one, oxacyclotetradecan-3-one, oxacyclotetradecan-4-one, oxacyclotetradecan-5-one, oxacyclotetradecan-6-one, oxacyclotetradecan-7-one, oxacyclotetradecan-8-one, azacyclotetradecan-3-one, azacyclotetradecan-4-one, azacyclotetradecan-5-one, azacyclotetradecan-6-one, azacyclotetradecan-7-one, azacyclotetradecan-8-one, thiacyclotetradecan-2-one, thiacyclotetradecan-3-one, thiacyclotetradecan-4-one, thiacyclotetradecan-5-one, thiacyclotetradecan-6-one, thiacyclotetradecan-7-one, thiacyclotetradecan-8-one, oxacyclopentadecan-2-one, oxacyclopentadecan-3-one, oxacyclopentadecan-4-one, oxacyclopentadecan-5-one, oxacyclopentadecan-6-one, oxacyclopentadecan-7-one, oxacyclopentadecan-8-one, azacyclopentadecan-3-one, azacyclopentadecan-4-one, azacyclopentadecan-5-one, azacyclopentadecan-6-one, azacyclopentadecan-7-one, azacyclopentadecan-8-one, thiacyclopentadecan-2-one, thiacyclopentadecan-3-one, thiacyclopentadecan-4-one, thiacyclopentadecan-5-one, thiacyclopentadecan-6-one, thiacyclopentadecan-7-one, thiacyclopentadecan-8-one. In one embodiment, the 3- to 15-membered monocyclic heterocyclic ketone group may be substituted with one or more of the following groups-halo, —OH, —CN, —NO$_2$, —C≡CH, —SH, —C$_1$-C$_6$ lower alkyl, —(C$_1$-C$_7$alkyl)-OH, —NH$_2$, —NH(C$_1$-C$_7$alkyl), —N(C$_1$-C$_7$alkyl)$_2$, —O(C$_1$-C$_7$alkyl), —C(O)—O(—C$_1$-C$_7$ alkyl), —C(O)OH; —C(O)—H, or —C(O)—(C$_1$-C$_7$ alkyl). For the avoidance of doubt, the 3-5 membered monocyclic heterocyclic ketone does not include any amide groups where the ketone enolisable carbonyl group is adjacent a N atom in the cyclic structure.

The term "halo" as used herein refers to —F, —Cl, —Br or —I.

The term "an enolisable carbonyl" means a compound that has one or more carbonyl functional groups and wherein at least one of the carbonyl functional groups has alpha hydrogens (Hα) that may be removed by a base to form an enolate and then an enol as shown in the reaction scheme below.

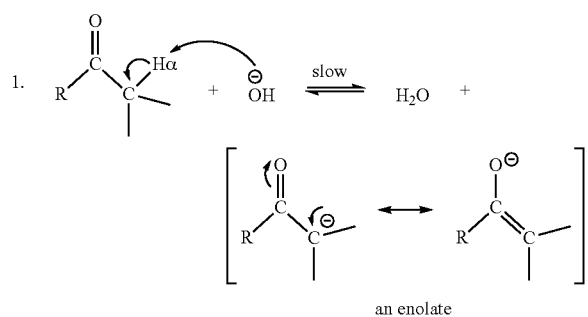

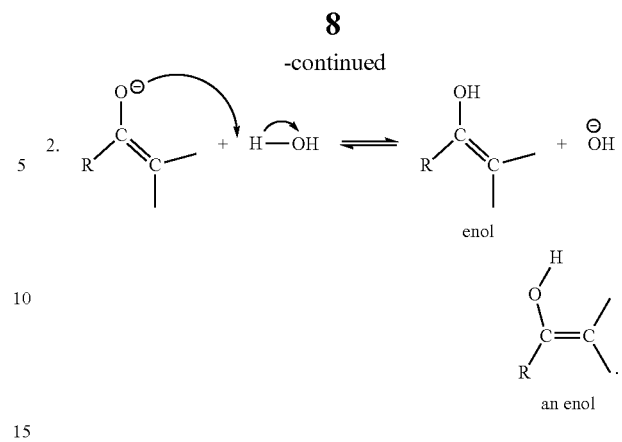

It is to be understood that the term enolisable carbonyl as used in the specification does not include a compound having solely an aldehyde functional group, a compound having solely a carboxylic acid functional group, a compound having solely an amide functional group, a compound having solely an acyl halide functional group or acetylacetone. The enolisable carbonyls of the invention include without limitation those exemplified in the specification and defined by Formulae I and II, and without limitation also include the following enolisable carbonyls: 1-acetonaphthone, 2-acetonaphthone, 4-methyl-1-acetonaphthone, 1'-hydroxy-2'-acetonaphthone,2'-hydroxy-1'-acetonaphthone, 2-methoxy-1-acetonaphthone, 4-fluoro-1-acetonaphthone; 2-acetylphenanthrene, 3-acetylphenanthrene, 4-acetylphenanthrene, 9-acetylphenanthrene, 6-bromo-9-acetylphenanthrene, 9-fluoro-10-acetylphenanthrene, 9-fluorenone, 9-fluorenone oxime, 2-nitro-9-fluorenone, 3-nitro-9-fluorenone, 4-nitro-9-fluorenone, 2,6-dinitro-9-fluorenone, 2,7-dinitro-9-fluorenone, 2,3,7-trinitro-9-fluorenone, 2-fluoro-9-fluorenone, 1-bromo-9-fluorenone, 2-bromo-9-fluorenone, 2,7-dichloro-9-fluorenone, 2,7-dibromo-9-fluorenone, 2-hydroxy-9-fluorenone, 4-hydroxy-9-fluorenone; 1-methylfluoren-9-one; 4-methylfluoren-9-one; 3,4-dihydro-2(1H)-quinolinone, 7-hydroxy-3,4-dihydro-2(1H)-quinolinone, 6-hydroxy-3,4-dihydro-2(1H)-quinolinone, 8-bromo-2,3-dihydro-4(1H)-quinolinone, 3-butyl-4-hydroxy-1-methyl-2(1H)-quinolinone, 6-fluoro-4,4-dimethyl-3,4-dihydro-2(1H)-quinolinone, 8-fluoro-4,4-dimethyl-3,4-dihydro-2(1H)-quinolinone, 2,6-dimethyl-4(1H)-quinolinone, 3-butyl-4-hydroxy-1-methyl-2(1H)-quinolinone, 1-indanone,5,6-dimethoxy-1-indanone, 6-bromo-1-indanone, 6-methoxy-1-indanone, 2-bromo-1-indanone, 4-bromo-1-indanone, 5-bromo-1-indanone, 5-chloro-1-indanone, 6-chloro-1-indanone, 4,7-dimethyl-1-indanone, 2-methyl-1-indanone, 4-methyl-1-indanone, 5-fluoro-1-indanone, 6-fluoro-1-indanone, 6-(trifluoromethyl)-1-indanone, 4-methoxy-1-indanone, 3,5-dimethoxy-1-indanone, 4,7-dimethoxy-1-indanone, 5-hydroxy-1-indanone, 4-hydroxy-1-indanone, 7-hydroxy-1-indanone, 2-indanone oxime, 2,2-di(methylthio)-1-indanone, (2,4-dimethoxyphenyl)acetone, 3,5-dimethoxyacetophenone, 4-(4-methoxyphenyl)-2-butanone, 3-methoxyphenylacetone, 4-methoxy acetophenone, 4-methoxy-2-phenylacetophenone, 2,5-dimethylphenylacetone, 3,4,5-trimethoxyphenylacetone, 4-hydroxy-3-phenylbutan-2-one, 3-hydroxy-4-phenylbutan-2-one, 3-hydroxy-3-phenylbutan-2-one, 4-hydroxy-4-phenylbutan-2-one, 1-hydroxy-3-phenylbutan-2-one, 3-hydroxy-1-phenylbutan-2-one, 3-hydroxy-1,3-diphenylbutan-2-one, 4-hydroxyphenylacetone, 3,4-dihydroxyphenylacetone, 4-nitrophenylacetone, acetophenone, 4-methyl acetophenone, benzylacetone, 3-methylphenylacetone, 4-methylphenylacetone, 4-ethylphenylacetone, 1-phenylbutan-2-one, 3-phenylbutan-2-one, 4-phenylbutan-2-one, 1-bromo-4-phenylbutan-2-one, 3-methyl-1-phenylbutan-2-one, 3-methyl-4-phenylbutan-2-one, ethyl phenyl ketone, butyl phenyl ketone, cyclopropyl phenyl ketone, cyclopentyl phenyl ketone, cyclobutyl phenyl ketone, cyclohexyl phenyl ketone, 2-phenylcyclopentanone, 3-phenylcyclopentanone, 2-phenylcyclohexanone, 3-phenylcyclohexanone, 2-phenylcycloheptanone,3-phenylcycloheptanone, 4-chlorophenyl acetone, 4-chloro-2-phenylacetophenone, 2,6-dichlorophenylacetone, 3-chlorophenylacetone, 2,6-difluorophenylacetone, 1-bromo-1-phenylbutan-2-one, 3-bromo-4-phenylbutan-2-one, 1-bromo-4-phenylbutan-2-one, 3-chloro-4-phenylbutan-2-one, 2-acetylthiophene, cyclopropyl-2-thienyl ketone, 2-acetylfuran, 2-furyl methyl ketone, 1-acetylpyrrole, 2-acetylpyrrole, 4-methyl-2-phenylacetophenone, 1,3-diphenylacetone, 4,4-diphenylbutan-2-one, benzophenone, 4-napthyl phenyl ketone, 2-benzoylpyridine, 3-benzoylpyridine, 4-benzoylpyridine, 2-(4-chlorobenzoyl) pyridine, 2-benzoylthiophene, 2-benzoylpyrrole, di(3-thiophenyl) methanone, 3-phenyl-1-(2-thienyl)-2-propen-1-one, and piperonyl acetone.

The term "tertiary amine containing compound" preferably means a compound having at least one tertiary amine group, but it is to be appreciated that the compound may have more than one tertiary amine group or further may be a mixture of tertiary amine containing compounds. Preferably the tertiary amine containing compound is a base, such as a Lewis base. If the base is a Lewis base, it is envisaged that a Lewis adduct may be formed with the enolisable carbonyl. In one embodiment it is preferred that the tertiary amine containing compound is immiscible with water at or above 20 degrees Celsius under one standard atmosphere of pressure. The solution may include a combination of more than one tertiary amine containing compound. The tertiary amine containing compound may be aliphatic, conjugated, asymmetric or cyclic or a combination thereof.

Examples of suitable tertiary amine containing compounds include the following:

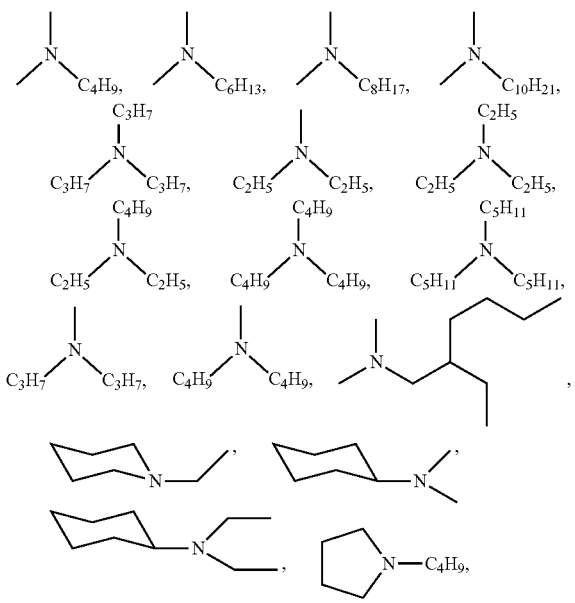

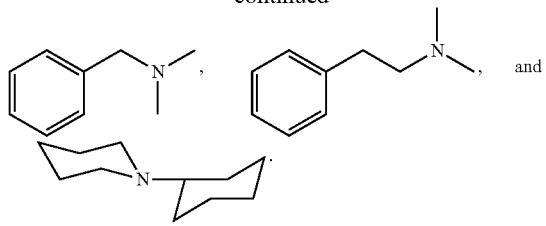

In one embodiment the tertiary amine containing compound is selected from 1-ethylpyrrolidine, 2-methylpyridine, N-methylpiperidine and 4-ethylmorpholine.

In one embodiment the tertiary amine containing compound is selected from a —N($C_1$-$C_7$ alkyl)$_3$. In another embodiment the tertiary amine containing compound is selected from a —N($C_1$-$C_4$ alkyl)$_3$. In yet a further embodiment the tertiary amine containing compound is —N($C_2$ alkyl)$_3$ (triethylamine).

It will be appreciated that the above listed tertiary amine containing compounds are simple enough for production on an industrial scale.

The present invention is directed to a salt recovery solution suitable for recovering a salt from a first aqueous solution, the salt recovery solution comprising:
  a) at least one tertiary amine containing compound; and
  b) at least one enolisable carbonyl.

In one embodiment the salt recovery solution comprises:
  a) at least one tertiary amine containing compound; and
  b) at least one enolisable carbonyl of Formula I,

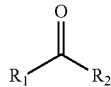

Formula I wherein
  c) $R_1$ and $R_2$ are independently selected from a —$C_1$-$C_7$ alkyl or a —$C_3$-$C_7$ monocyclic; or
  d) one of $R_1$ or $R_2$ is selected from a —O—($C_1$-$C_7$ alkyl) and the other is selected from a —$C_1$-$C_7$ alkyl, or
  e) $R_1$ and $R_2$ together, with the carbonyl of Formula I, form a 3-15 membered monocyclic ketone or a 3-15 membered monocyclic heterocyclic ketone.

In another embodiment the salt recovery solution comprises at least one enolisable carbonyl of Formula I,

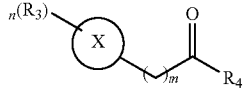

Formula II wherein X is a 5-8 membered aromatic monocyclic optionally containing a heteroatom selected from S, N or O;
each $R_3$, if present, is selected independently from a halo, a hydroxy, a —$NO_2$, a $C_1$-$C_7$ alkyl, or a —O—($C_1$-$C_7$ alkyl);
$R_4$ is selected from a halo, a —O—($C_1$-$C_7$ alkyl); a $C_1$-$C_7$ alkyl optionally substituted with a halo, a hydroxy, a —O—($C_1$-$C_7$ alkyl) or a $C_3$-$C_7$ monocyclic; or a $C_3$-$C_7$ monocyclic optionally substituted with a halo, a hydroxy, a $C_1$-$C_7$ alkyl, or a —O—($C_1$-$C_7$ alkyl);

m is 0, 1, 2 or 3 carbons, each carbon being optionally substituted with one or more substituents selected from a halo, hydroxy, a $C_1$-$C_7$ alkyl optionally substituted with a halo or a hydroxy; a $C_1$-$C_7$ alkyl, a —O—($C_1$-$C_7$ alkyl) or a $C_3$-$C_7$ monocyclic; and n is 0, 1, 2 or 3.

In another aspect, the present invention provides a process for recovering a salt from a first aqueous solution, the process including the step of:

(a) adding the salt containing first aqueous solution to a salt recovery solution; and (b) allowing the salt to precipitate on passage through the salt recovery solution.

Wherein the process is a non-membrane process.

Wherein the process is a non-osmotic process.

Wherein use of the salt recovery solution is in a non-membrane and non-osmotic process.

In one embodiment the process is a minimal liquid discharge process.

In one embodiment the process is a zero liquid discharge process.

In a further embodiment the process includes the further step of adding an additive to the salt recovery solution to further release water held within the salt recovery solution. In one embodiment the additive is citric acid. In one embodiment the citric acid is a concentrated solution of citric acid comprising between about 200-450 gms of citric acid per litre of water. In another embodiment the citric acid is anhydrous citric acid added directly to the salt recovery solution.

In a further embodiment the salt recovery solution is recovered. In a further embodiment the salt recovery solution is recycled for use in a further separation process. In a further embodiment the process is a continuous process.

It is to be appreciated that the molar ratio of the tertiary amine containing compound to the enolisable carbonyl may vary widely and may be from about 1:99 or 99:1; or from about 1:50 or 50:1 or from about 1:10 or 10:1 or from about 1:5 or 5:1 or from about 1:3 or from about 3:1 or from about 1:2 or from about 2:1. In a preferred embodiment the molar ratio is about 1:1. A chemistry technician would be able to routinely determine the most suitable molar ratio depending on the purpose for which the salt recovery solution is to be employed.

In a further embodiment the first aqueous solution is salt water or a brine solution.

EXAMPLES

The examples described herein are provided for the purpose of illustrating specific embodiments of the invention and are not intended to limit the invention in any way. Persons of ordinary skill can utilise the disclosures and teachings herein to produce other embodiments and variations without undue experimentation. All such embodiments and variations are considered to be part of this invention.

Example 1

In a first example and with reference to FIG. 1, a salt recovery solution was prepared using triethylamine (TEA) and methyl ethyl ketone (MEK) in the molar ratio of 0.5:1.

A saturated sodium chloride salt solution was introduced to the salt recovery solution—see step 1 of FIG. 1. After adding a few drops of saturated salt solution, it was observed that salt crystals separated out from water and settled at the bottom instantly—see step 2 of FIG. 1. The water formed the aqueous layer with salt precipitate at the bottom of the vial. The salt recovery solution along with the aqueous layer was decanted and the salt was then dried. This demonstrated the recovery of salt from a saturated salt solution using a salt recovery solution and with no liquid discharge. It was also recognised that despite there being a separate layer of water formed at the bottom of the vial, there was a small quantity of water that had been absorbed by the salt recovery solution. Accordingly, a weak acid, citric acid, was used as an additive to help desorb the water from the salt recovery solution. This step (see Step 3 in FIG. 1) was required to re-establish a system that would desorb all the water from the salt recovery solution and reinstate the capability of the salt recovery solution to separate the salt from water for use in a further separation step or in a continuous separation process. It was observed that upon adding as few as 5 drops of saturated citric acid, a thin layer of water became apparent at the bottom of the vial. Furthermore, it has been established that the citric acid got washed through to the aqueous phase rather than being retained in the salt recovery solution phase. Thus, the water was extracted from the salt recovery solution by using a citric acid solution. The last step (not shown in FIG. 1) was to check if the ability of the recycled salt recovery solution to salt-out was restored. The salt recovery solution was removed from the salt solution and then re-tested to see if the salt recovery solution could be re-used to cause additional saturated salt solution that was dropped into the salt recovery solution to precipitate out salt. It was found that the recycled salt recovery solution could effectively separate out salt again from a second saturated salt solution introduced to the salt recovery solution. The salt again precipitated to the bottom of the test vial after passage through the salt recovery solution. A similar aqueous/precipitate layer formed under the non-aqueous salt recovery solution layer in the vial.

Example 2 Salt Recovery from 50,000 and 100,000 ppm NaCl Brine Solutions

A salt recovery solution was prepared using triethylamine (TEA) and methyl ethyl ketone (MEK) in the molar ratio of 0.5:1. Two brine solutions were prepared. One brine solution comprised sodium chloride at a concentration of 50 grams per litre (50,000 ppm NaCl) and the other brine solution comprised sodium chloride at a concentration of 100 grams per litre (100,000 ppm NaCl). The brine solutions were separately introduced to 10 mL of the salt recovery solution. The salts were observed to precipitate immediately. The addition of the brine solution to the salt recovery solution was stopped as soon as a thin aqueous phase was observed at the bottom of the vial. This indicated that the maximum absorption capacity of the salt recovery solution had been reached. The volume of brine solution added once the aqueous layer started to develop was recorded.

The results for the 50 000 ppm NaCl brine solution are shown in Table 1.

TABLE 1

50 000 ppm NaCl solution Samples-Maximum Absorption Capacity Experiments

| Volume of salt recovery solution (V1) in mL | Volume of brine solution added for complete absorption in mL | Volume of excess brine (approx) in mL |
|---|---|---|
| 10 | 0.25 | 0.0000 |
| 10 | 0.30 | 0.0000 |
| 10 | 0.35 | 0.0000 |
| 10 | 0.40 | 0.0050 |

From Table 1, the ratio between the salt recovery solution and the 50 000 ppm NaCl brine solution for complete water absorption was approximately 29:1.

The results for the 100 000 ppm NaCl brine solution are shown in Table 2.

TABLE 2

100 000 ppm NaCl solution Samples-Maximum Absorption Capacity Experiments

| Volume of dry salt recovery solution (V1) in mL | Volume of brine added for complete absorption in mL | Volume of excess brine (approx.) in mL |
|---|---|---|
| 10 | 0.25 | 0.0000 |
| 10 | 0.35 | 0.0000 |
| 10 | 0.45 | 0.0000 |
| 10 | 0.50 | 0.0010 |

From Table 2, the ratio between the salt recovery solution and the 100 000 ppm NaCl solution for complete water absorption was approximately 22:1.

In the case of a larger scale process, it would be recommended that the process operate at higher ratios of salt recovery solution to brine solution to ensure a total absorption of water and avoid brine carry-over.

The input salt concentrations were measured, and the dry weights of samples recorded containing 0.2 mL, 0.5 mL and 1 mL of both 50 000 ppm NaCl solution and 100 000 ppm NaCl solution respectively. The input salt results are shown in (Table 3) and the percent salt recovery results are shown in Table 4.

The output salt concentrations were also determined as follows.

0.20 mL and 0.40 mL of brine were added to 10 mL of the salt recovery solution.

The water from the brine was absorbed by the salt recovery solution and the salts precipitated.

The precipitated salts were allowed to settle to the bottom of the glass vial overnight.

Diluted salt recovery solution (which absorbed the water from the brine) was filtered into a clean vial The dry weight of the salt (output) was measured and recorded once completely dried in the block heater operating at 150° C. (Table 3).

Salt recovery % was determined by the formula:

$$\frac{\text{Dry weight of salt (output)}}{\text{Dry weight of salt (input)}} \times 100$$

Results

TABLE 3

Dry weights of initial salt concentration

| Brine solution | Volume of brine solution in mL | Dry weight of salt input (avg) in mg |
|---|---|---|
| 50 000 ppm NaCl solution | 0.20 | 10.00 |
| | 0.50 | 25.00 |
| | 1.00 | 50.00 |
| 100 000 ppm NaCl solution | 0.20 | 20.00 |
| | 0.50 | 50.00 |
| | 1.00 | 100.00 |

TABLE 4

Salt recovery % of the salt recovery material.

| Brine solution | Volume of salt recovery solution (mL) | Volume of brine solution added (mL) | Dry weight of salt precipitated* (output) avg in mg | Salt recovery % = Dry weight of salt output/Dry weight of salt input × 100 |
|---|---|---|---|---|
| 50 000 ppm NaCl solution | 10.0000 | 0.2000 | 0.0112 | 112.0000 |
| 50 000 ppm NaCl solution | 15.0000 | 0.4000 | 0.0209 | 104.5000 |
| 50 000 ppm NaCl solution | 10.0000 | 0.2000 | 0.0107 | 107.0000 |
| 100 000 ppm NaCl solution | 10.0000 | 0.2000 | 0.0243 | 121.5000 |
| 100 000 ppm NaCl solution | 10.0000 | 0.2000 | 0.0206 | 103.0000 |
| 100 000 ppm NaCl solution | 10.0000 | 0.4000 | 0.0507 | 126.7500 |

*The dry weights are the average values of each set of two trials.

Salt recovery: From the above results, it can be seen that it is possible to achieve around 100% salt and water recovery from the brine solution when the volume of brine added is just below the maximum absorption capacity of the salt recovery solution. The deviation in salt recoveries can be attributed to the unavoidable error to the small scale of the experiments.

At the maximum absorption capacity of the salt recovery solution: The decrease in salt recovery % maybe due to sub-optimal crystallization and loss of mass during the filtering process. With the excess brine developing, the calculations become harder due to small volumes and experimental errors.

Salt Rejection Percentage

The salt rejection percentage was estimated to show that only water was being absorbed by the salt recovery solution from the brine solution and that the salt recovery solution was rejecting substantially all of the salt from the brine. The conductivity of pure water, the neat brine solution and the concentrated salt recovery solution were measured. For 10 mL of the concentrated salt recovery solution, different volumes of brine solution were added and the conductivity of the diluted salt recovery solution (concentrated salt recovery solution+water absorbed) was measured (Table 5).

The conductivity of the brine solution and dry concentrated salt recovery solution were compared.

The salt rejection % was calculated by the following formula:

$$\frac{\text{Conductivity of brine solution}\left(\frac{\mu S}{cm}\right) - \text{Conductivity of salt recovery solution with absorbed water}\left(\frac{\mu S}{cm}\right)}{\text{Conductivity of brine solution}\left(\frac{\mu S}{cm}\right)} \times 100$$

Conductivity of pure water in $\mu S/cm = 0.0$

Conductivity of concentrated salt recovery solution in $\mu S/cm = 0.4$

Conductivity of concentrated salt recovery solution with distilled water $\mu S/cm = 37$

TABLE 5

Conductivity measurements of the salt recovery solution along with absorbed water and salt rejection % calculations

| Conductivity of 50 000 ppm NaCl solution in μS/cm | Conductivity of salt recovery material with absorbed water μS/cm | Salt rejection % |
|---|---|---|
| 78,600 | 9.1 | 99.99 |
|  | 8.2 | 99.99 |
|  | 6.1 | 99.99 |

| Conductivity of 100 000 ppm NaCl solution in μS/cm | Conductivity of salt recovery material with absorbed water μS/cm | Salt rejection % |
|---|---|---|
| 148,600 | 10.8 | 99.99 |
|  | 11.6 | 99.99 |
|  | 9.6 | 99.99 |

The salt rejection % of over 99 is indicative of the fact that there is complete precipitation of salt from the brine solution and there are no residual salts going into the salt recovery solution.

We can conclude that the water absorbed from the brine solution is free of salts because the conductivity measurements of the salt recovery solution with water absorbed from the brine is equivalent to that of salt recovery solution with distilled water.

From the above examples we can conclude that we are able to absorb all the water from both 50 000 ppm NaCl solution and 100 000 ppm NaCl solution solutions when the volumetric ratio of the slat recovery solution to brine is above 25. For large scale process it is recommended to run at higher ratios to avoid formation of saturated brine solution and to obtain a 100% salt recovery by absorbing all the water.

From the results of Example 2, we can see that the recovery percentages are close to 100% when the volume of brine added is below the maximum capacity of the salt recovery solution. Factors such as formation of hydrates, experimental and instrumental errors are to be taken into consideration.

Based on the conductivity results, an average salt rejection percentage of 99.99 is observed in both the brine solutions which means that we are completely precipitating out the salts from the brine solution.

The salt recovery solution can achieve close to 100% salt and water recovery by minimizing the volume of feed solution in a thermo-efficient way unlike the traditional treatment systems. The lab scale results are indicating that there are no salts going into the salt recovery solution during the absorption process and that the purity of absorbed water is relatively high.

Example 3 Salt Recovery of Brine Solutions from Industrial Operations

Brine solutions from industrial operations (Brine Samples 1, 2 and 3) were obtained having the compositions as tabulated in Table 6.

TABLE 6

Brine Sample Compositions

| Analyte | Brine Sample 1 Concentration (mg/L) | Brine Sample 2 Concentration (mg/L) | Brine Sample 3 Concentration (mg/L) |
|---|---|---|---|
| Alkalinity, Bicarbonate as CaCO3 | 293 | 100 | 376 |
| Chloride | 1950 | 126000 | 34600 |
| Sulfate | 5950 | 910 | ND |
| Barium | 0.012 | 6.21 | 240 |
| Calcium | 501 | 14500 | 1790 |
| Magnesium | 359 | 2110 | 180 |
| Manganese | 0.011 | 8 | 4 |
| Potassium | 3.62 | 1010 | 142 |
| Sodium | 3100 | 47500 | 19000 |
| Strontium | 6.93 | 1270 | 209 |
| Boron | 30.7 | ND | 25 |
| Iron | ND | ND | 181 |
| Total Dissolved Solids | 12300 | 215000 | 55400 |

Brine having the compositions of Sample 1, Sample 2 and Sample 3 was each separately and slowly added to 10 mL of the salt recovery solution as defined above, specifically using triethylamine (TEA) and methyl ethyl ketone (MEK) in the molar ratio of 1:2. The water from the brine was absorbed by the salt recovery solution and the salts began to precipitate. The addition of each brine solution continued until bubbles of a separate phase could be observed at the bottom of the vial after shaking. These bubbles of separate phase comprise water, which is no longer being absorbed by the salt recovery solution, and which indicates that the maximum water absorption capacity of the salt recovery solution had been reached. The volume at which the aqueous layer started to form for each sample (repeated 5 times) was recorded and the results are shown in Table 7.

TABLE 7

| Sample number | Volume of dry salt recovery solution (V1) in mL | Volume of brine Sample 1 added for maximum absorption in mL | Volume of brine Sample 2 added for maximum absorption in mL | Volume of brine Sample 3 added for maximum absorption in mL |
|---|---|---|---|---|
| 1.1 | 10 | 0.75 | 0.20 | 0.35 |
| 1.2 | 10 | 0.78 | 0.15 | 0.38 |
| 1.3 | 10 | 0.8 | 0.12 | 0.36 |
| 1.4 | 10 | 0.85 | 0.13 | 0.41 |
| 1.5 | 10 | 0.85 | 0.13 | 0.42 |
| Average | — | 0.81 | 0.15 | 0.38 |
| Std Dev | — | 0.04 | 0.03 | 0.03 |

From Table 7, it can be seen that quite a large variation between the three brine samples exists in terms of absorption capacity. Brine Sample 1 has the highest capacity at 0.81 mL (+/−0.04) and Brine Sample 2 having the lowest at 0.15 mL (+/−0.03). This reflects the differing salt compositions and concentrations of each of the commercial brine samples and demonstrates the importance of knowing what the composition of the brine is before salt recovery treatment. Once the average maximum absorption capacity for 10 mL of salt recovery solution was met, the salt recovery solution would be diluted and would be unable to absorb water and precipitate salts effectively. It is to be appreciated that for large scale processes, it would be desirable to utilize higher ratios of salt recovery solution relative to the brine solution to ensure a total absorption of water and avoid brine carry-over.

Salt and Water Recovery Capacity of Salt Recovery Solution

To ensure full water absorption when calculating the salt and water recovery capacity, between 80-85% of the maximum brine absorption capacity was used in the following experiments. This ensured that the quantity of brine sample which was added to the salt recovery solution (triethylamine (TEA) and methyl ethyl ketone (MEK) in the molar ratio of 1:2) was sufficiently under the maximum absorption concentration to ensure full adsorption of the water with no brine carry-over.

The quantity of brine added to 20 mL of salt recovery solution, in a pre-weighed vial, was adjusted to be slightly below maximum water absorption as follows:

Brine Sample 1: 1.4 mL
Brine Sample 2: 0.24 mL
Brine Sample 3: 0.65 mL

The brine and the salt recovery solution were mixed and resulted in the salt precipitating out. The Samples were left for 20 mins to ensure full separation of the solid salts.

The now wet salt recovery solution was decanted into a clean vial using a 5 mL syringe to carefully remove the wet salt recovery solution from the precipitated salts without transferring any salts into the fresh vial (approx. 17 mL, measuring the actual quantity in each individual case).

The salt slurry left behind was heated at 110° C. for 1 hour to remove the left-over salt recovery material. The dried salt was cooled and then weighed. The weight of the clean vial was deducted to obtain the weight of salt recovered. The results are tabulated in Table 8.

TABLE 8

Raw data from the salt recovery experiments.

| Brine Sample | Vial tare weight (g) | Brine (mL) | Vial weight after drying (g) | Salt collected (g) | Salt expected (g) | % salt recovered |
| --- | --- | --- | --- | --- | --- | --- |
| Brine Sample 1 | 15.1620 | 1.4 | 15.2188 | 0.0568 | 0.05025 | 113 |
|  | 15.0258 | 1.4 | 15.0859 | 0.0601 | 0.05025 | 120 |
|  | 15.0369 | 1.4 | 15.0957 | 0.0588 | 0.05025 | 117 |
| Brine Sample 2 | 15.1319 | 0.24 | 15.1886 | 0.0567 | 0.0578 | 98 |
|  | 15.0513 | 0.24 | 15.1101 | 0.0588 | 0.0578 | 102 |
|  | 14.9817 | 0.24 | 15.0396 | 0.0579 | 0.0578 | 100 |
| Brine Sample 3 | 15.146 | 0.65 | 15.1929 | 0.0469 | 0.0475 | 99 |
|  | 13.5146 | 0.65 | 13.572 | 0.0574 | 0.0475 | 121 |
|  | 13.2655 | 0.65 | 13.3221 | 0.0566 | 0.0475 | 119 |

The salt recovery percentage was determined by the following formula.

$$\frac{\text{Dry weight of salt (output)}}{\text{Dry weight of salt (input)}} \times 100$$

Table 8 above details the raw data collected to calculate the percentage of salt recovered. The "salt expected" was calculated by evaporating the same amount of raw brine as was added to each sample, in a heat block at 110° C. This measured how much salt was in each brine sample and allowed for the calculation of what percentage of this initial brine was collected (see Table 9).

TABLE 9

Calculating the dry weight of brine for the 'salt expected' column.

| Brine | Dry Weight | Average |
| --- | --- | --- |
| Brine Sample 1 | 0.0482 | 0.0505 |
|  | 0.0523 | (+/−0.0023) |
|  | 0.0483 |  |
|  | 0.0534 |  |
| Brine Sample 2 | 0.0576 | 0.0559 |
|  | 0.0581 | (+/−0.0019) |
|  | 0.054 |  |
|  | 0.0539 |  |
| Brine Sample 3 | 0.043 | 0.0446 |
|  | 0.052 | (+/−0.0043) |
|  | 0.0414 |  |
|  | 0.0419 |  |

Figure 2:
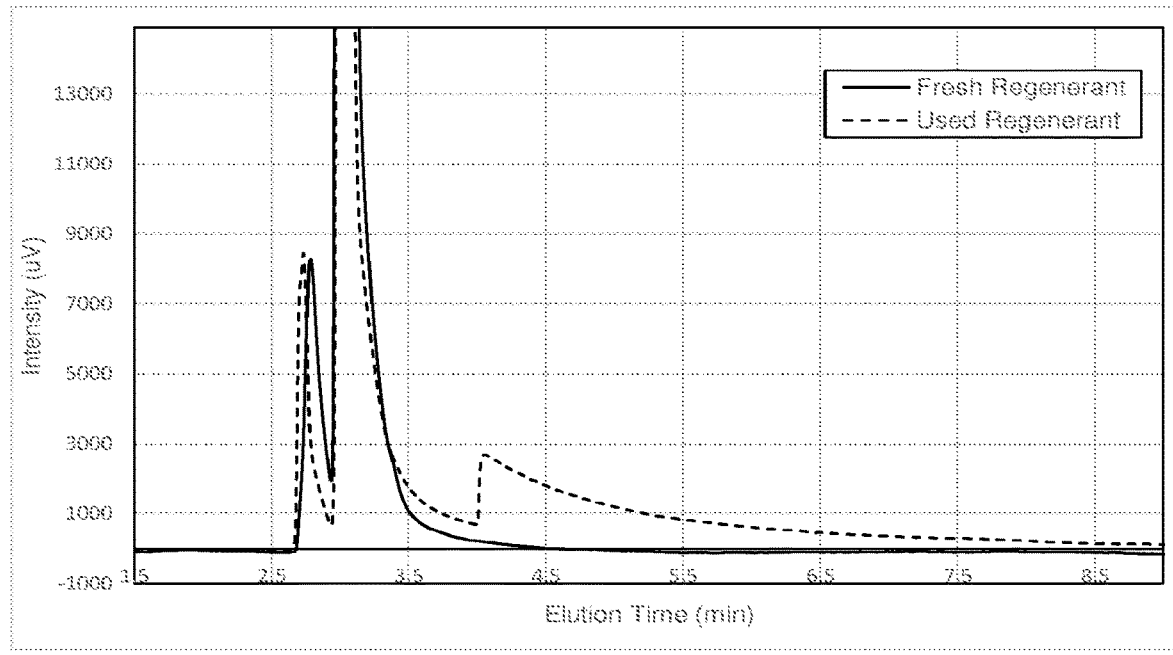
FIG. 2 shows gas chromatograms of the additive or regenerant solution overlaid with the additive or regenerant solution which has been used to remove water from a wet salt recovery solution.

The decanted and wet salt recovery material was regenerated using a regenerating agent/regenerant (0.3-0.5 mL) using the following method. The regenerating agent, which was a concentrated solution of citric acid (412 g/L) or anhydrous citric acid was added to the diluted/wet salt recovery solution from the previous step to separate the water absorbed by the salt recovery solution. It has been found, and gas chromatographic data has shown that some of the salt recovery solution is dissolved into the regenerant. With reference to FIG. 2, it can be seen that the gas chromatogram of fresh regenerant shows a small peak at 2.8 mins and a larger slightly trailing peak at 3.0 mins. This larger peak is water which is used as the solvent for the regenerant. It is considered that the tail is caused by the regenerant material bonding with water molecules. The trailing peak at 4.1 mins is highly characteristic of the salt recovery solutions and clearly indicates that some of the salt recovery solution has leached into the regenerant. Because of the trailing shape of this peak and the overlap of the first peaks, it is not possible to accurately quantify the amount of salt recovery solution which has crossed over into the regenerant, however, semi-quantitative analysis of multiple samples has suggested that up to about 15% of the salt recovery solution has crossed over into the regenerant. To minimise this cross over, the amount of regenerating agent used is selected to be as little as possible. In order to determine the amount of water recovered from the process a known volume of regenerating agent was added to the diluted salt recovery solution. The regenerating agent removed the water from the diluted salt recovery solution to leave a concentrated salt recovery solution. Because of the difference in density between the regenerating agent and the concentrated salt recovery solution, the concentrated salt recovery solution (now non-aqueous or dry) rises to the top while the now diluted regenerating agent sinks to the bottom of the vial. The bottom aqueous layer was carefully removed to a measuring cylinder and the volume recovered was recorded in Table 10. The volume of the aqueous layer was measured using the following formula.

Volume of water recovered (mL)=Volume of aqueous phase (mL)−Volume of regenerant (mL)

The water recovery % was calculated by the formula (Table 10):

$$\frac{\text{Volume of water recovered}}{\text{Volume of brine added}} \times 100$$

maximum absorption capacity of the salt recovery solution. It is to be appreciated that the deviation seen in the salt recoveries can be attributed to the hydration of salts and the unavoidable error due to the small scale of these experiments.

Figure 3:
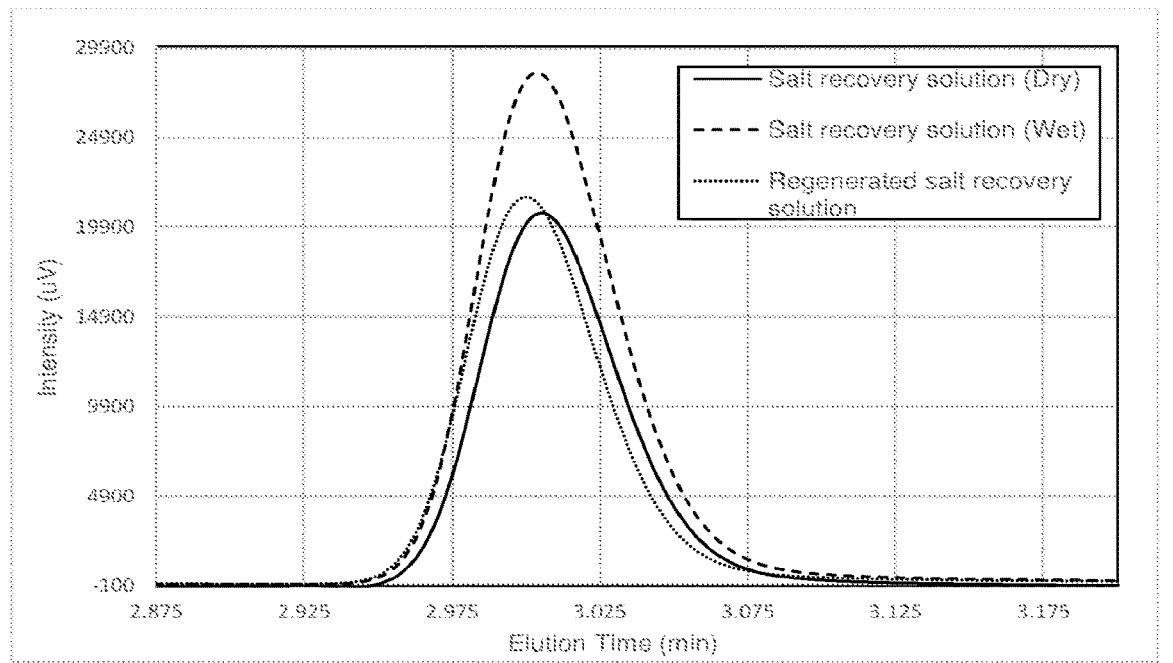
FIG. 3 shows a series of overlaid gas chromatograms of the salt recovery solution before brine addition, with absorbed water after brine addition and then after the salt recovery solution has been regenerated.

To support the gravimetric data presented above, an example of gas chromatogram traces is shown in FIG. 3. FIG. 3 shows an example gas chromatograph of Brine Sample 1 focusing on the water peak. The black (solid line) trace is the salt recovery solution before the addition of the brine sample. The second trace (long dash line) shows the water content after the brine sample has been added and shows a clear increase in intensity. The third trace (dotted line) shows the water content after the regenerant has been used to release the water from or dry the salt recovery solution, and clearly shows the water content has largely returned to the same prior to brine sample addition. This shows that the salt recovery solution has been regenerated and is ready for reuse.

All GC data was collected on a SHIMADZU Nexis 2030 gas chromatograph fitted with a SUPELCO WATERCOL 1910 column. The GC parameters were set up as shown below:

TABLE 10

Water recovery % of the salt recovery solution (All values are averaged values from two trials.) Gravimetric data and analysis

| Brine | Salt Recovery Solution (mL) | Brine (mL) | Regenerant (mL) | Water collected (mL) | % water recovered | Salt collected (g) | % salt recovered |
|---|---|---|---|---|---|---|---|
| Brine Sample 1 | 20 | 1.40 | 0.35 | 1.05 | 95 | 0.0568 | 113 |
| | 20 | 1.40 | 0.35 | 1.01 | 91 | 0.0601 | 120 |
| | 20 | 1.40 | 0.35 | 1.01 | 91 | 0.0588 | 117 |
| Brine Sample 2 | 20 | 0.24 | 0.35 | 0.20 | 107 | 0.0567 | 98 |
| | 20 | 0.24 | 0.50 | 0.18 | 95 | 0.0588 | 102 |
| | 20 | 0.24 | 0.35 | 0.18 | 96 | 0.0579 | 100 |
| Brine Sample 3 | 20 | 0.65 | 0.50 | 0.56 | 102 | 0.0469 | 99 |
| | 20 | 0.65 | 0.30 | 0.53 | 104 | 0.0574 | 121 |
| | 20 | 0.65 | 0.30 | 0.53 | 104 | 0.0566 | 119 |

Table 11, below, shows the average water and salt recoveries across three samples for each of the brines tested. The majority of the salt recoveries are over 100%. This perhaps indicates some interaction between the salts in the brine and the salt recovery solution which results in the salts binding with the salt recovery solution, resulting in an increase in weight compared to when water is removed by evaporation alone.

TABLE 11

Percentage water and salt recovery (average of 3 samples)

| Brine | % water recovered | % salt recovered |
|---|---|---|
| Brine Sample 1 | 93 | 117 |
| Brine Sample 2 | 99 | 100 |
| Brine Sample 3 | 103 | 113 |

From the above results, it can be seen that it is possible to achieve 100% salt and water recovery from the brine solution when the volume of brine added is just below the

| Parameter | Setting |
|---|---|
| Injection Volume | 1.0 μL |
| Injection temperature | 250° C. |
| Injection mode | Split |
| Split ratio | 100.0 |
| Carrier gas | He |
| Carrier gas pressure | 53.1 kPa |
| Column flow | 0.93 mL/min |
| Liner velocity | 22.0 cm/s |
| Column length | 30.0 m |
| Column inner diameter | 0.32 |
| Column method | Isocratic |
| Column temperature | 163.0° C. |
| Total time | 9 min |
| Detector | TCD |
| TCD sample rate | 40 ms |
| TCD current | 70 mA |
| Makeup gas | He |
| Makeup flow | 8.0 mL/min |
| TCD temperature | 200° C. |

Table 12 below shows the quantity of brine water (measured by GC) in the salt recovery solution after it has been used to absorb water and the quantity of brine water left in the salt recovery solution after it has been regenerated. This provides a measure of how effective the regenerant has been at removing water from the salt recovery solution. As can be seen from Table 12, the quantity of water remaining in the salt recovery solution after regeneration is very small. This shows that the citric acid regenerant has been very effective in removing most of the brine water from the salt recovery solution.

TABLE 12 water absorbed by the salt recovery solution and water left in the salt recovery solution after regeneration, calculated from GC data.

| | Wet Salt Recovery Solution | | | Dry Salt Recovery Solution | | |
|---|---|---|---|---|---|---|
| Brine sample | GC Peak position | GC Peak area | Water absorbed by Salt Recovery Solution (mL) | GC Peak position | GC Peak area | Water in Salt Recovery GC Peak Solution after regeneration (mL) |
| 1 | 3.005 | 128022 | 1.10 | 3.001 | 99323 | 0.27 |
|   | 3.006 | 127162 | 1.08 | 3.006 | 93709 | 0.20 |
| 2 | 3.001 | 97534 | 0.55 | 3.004 | 100351 | 0.35 |
|   | 3.003 | 72778 | 0.18 | 3.004 | 69319 | −0.08 |
| 3 | 3.004 | 100270 | 0.61 | 3.000 | 72322 | 0.05 |
|   | 3.005 | 102327 | 0.65 | 3.000 | 68313 | 0.05 |

Example 4—Salt Recovery Solution Variations

Various salt recovery solutions were made up with amine(s) and ketone(s) in various specified molar ratios (see Tables 13-17 below). For each of the salt recovery solutions, brine 300 000 ppm NaCl, was slowly added to 5 mL of the selected salt recovery solution. Upon addition of the brine, the water from the brine was absorbed by the salt recovery solution and the salts in the brine precipitated out. The addition of the brine was stopped as soon as a separate phase started to form at the bottom of the vial after shaking. The presence of the separate phase shows that the maximum absorption capacity of the salt recovery solution has been reached. At this point the volume of the brine, which has been added to the salt recovery solution is recorded.

The salt and water recovery from the various salt recovery solutions tested in Tables 13-17 below were calculated as described above for the brine samples tested in Examples 2 and 3 above. The additive/regenerant used in this Example was concentrated citric acid solution 0.3 ml.

The following table, Table 13, summarises the maximum absorbing capacity of the salt recovery solution, along with the water recovery and the salts recovery of the different salt recovery solutions containing different amines with 2-butanone. 300 000 ppm NaCl solution was passed through each combination of the salt recovery solution outlined in the following Table 13. The salt and water recovery results listed in this table record one-off tests.

TABLE 13

| Amine | Ketone | Ratio of Amine:Ketone | Absorption capacity per 5 mL of salt recovery solution (mL) | Water recovery % (vol.) | Salts recovery % |
|---|---|---|---|---|---|
| TEA | 2-Butanone | 0.5:1 | 0.55 | 91 | 113 |
| Tripropylamine | 2-Butanone | 0.5:1 | 0.15 | 433 | 45 |

TABLE 13-continued

| Amine | Ketone | Ratio of Amine:Ketone | Absorption capacity per 5 mL of salt recovery solution (mL) | Water recovery % (vol.) | Salts recovery % |
|---|---|---|---|---|---|
| Dimethylbenzylamine | 2-Butanone | 0.5:1 | 0.2 | 325 | 128 |
| 1-Ethylpiperidine | 2-Butanone | 0.5:1 | 0.4 | 143 | 91 |
| 1-Ethylpyrrolidine | 2-Butanone | 0.5:1 | 0.6 | 83 | 91 |
| 2-Methylpyridine | 2-Butanone | 0.5:1 | 0.55 | 45 | 119 |
| 4-ethylmorpholine | 2-Butanone | 0.5:1 | 0.6 | 83 | 108 |

• TEA = triethylamine

The following table 14 summarises the maximum absorbing capacity of the salt recovery solution along with the water recovery and the salts recovery of the different salt recovery solutions containing triethylamine combined with different ketones. 300 000 ppm NaCl solution was passed through each combination of the salt recovery solution outlined in the following table 14. The salt and water recovery results listed in this table record one-off tests.

TABLE 14

| Amine | Ketone | Ratio | Absorption capacity per 5 mL of salt recovery solution (mL) | Water recovery % (vol.) | Salts recovery % |
|---|---|---|---|---|---|
| TEA | Butanone | 0.5:1 | 0.6 | 92 | 94 |
| TEA | Pentan-3-one | 0.5:1 | 0.15 | 167 | 110 |
| TEA | Pentan-2-one | 0.5:1 | 0.15 | 133 | 136 |
| TEA | Cyclopentanone | 0.5:1 | 0.3 | 100 | 117 |
| TEA | Cyclohexanone | 0.5:1 | 0.25 | 120 | 109 |
| TEA | Acetophenone | 0.5:1 | 0.15 | 233 | 109 |
| TEA | 4-Phenyl-2-butanone | 0.5:1 | 0.15 | 200 | 108 |

* TEA = triethylamine

The following table 15 summarises the maximum absorbing capacity of the salt recovery solution along with the water recovery and the salts recovery of the different salt recovery solutions containing up to three different amines combined with cyclohexanone. 300 000 ppm NaCl solution was passed through each combination of the salt recovery solution outlined in the following Table 15. The salt and water recovery results listed in this table record one-off tests.

TABLE 15

| Amine 1 | Amine 2 | Amine 3 | Ketone | Ratio of Amine 1:Amine 2:Amine 3:Ketone | Absorption capacity per 5 mL of salt recovery solution (mL) | Water recovery % (vol.) | Salts recovery % |
|---|---|---|---|---|---|---|---|
| TEA | N-MP* | 4-EM | CH | 0.3:0.1:0.1:1 | 0.4 | 75 | 101 |
| TEA | N-MP | 4-EM | CH | 0.3:0.1:0.1:1 | 0.4 | 110 | 108 |
| TEA, | N-MP | — | CH | 0.3:0.2:1 | 0.35 | 86 | 109 |
| TEA, | N-MP | — | CH | 0.3:0.2:1 | 0.35 | 133 | 99 |
| TEA, | — | 4-EM | CH | 0.3:0.2:1 | 0.4 | 88 | 106 |
| — | N-MP | 4-EM | CH | 0.3:0.2:1 | 0.5 | 80 | 107 |

TEA = triethylamine
N-MP = N-methylpiperidine
4-EM = 4-ethylmorpholine
CH = cyclohexanone The following table 16 summarises the maximum absorbing capacity of the salt recovery solution along with the water recovery and the salts recovery of the different salt recovery solutions containing up to two different amines combined with up to two different ketones. 300 000 ppm NaCl solution was passed through each combination of the salt recovery solution outlined in the following Table 16. The salt and water recovery results listed in this table record one-off tests.

TABLE 16

| Amine 1 | Amine 2 | Ketone 1 | Ketone 2 | Ratio of Amine 1:Amine 2:Ketone 1:Ketone 2 | Absorption capacity per 5 mL of salt recovery solution (mL) | Water recovery % (vol.) | Salts recovery % |
|---|---|---|---|---|---|---|---|
| TEA | 4-EM | 4-MCH | 2-B | 0.3:0.2:0.5:0.5 | 0.3 | 117 | 113 |
| TEA, | — | 4-MCH | 2-B | 0.5:0.5:0.5 | 0.3 | 100 | 107 |
| — | 4-EM | 4-MCH | 2-B | 0.5:0.5:0.5 | 0.55 | 100 | 118 |
| TEA | N-MP | 4-MCH | 2-B | 0.3:0.2:0.5:0.5 | 0.3 | 117 | 106 |
| — | N-MP | 4-MCH | 2-B | 0.5:0.5:0.5 | 0.4 | 120 | 110 |
| N-MP | 4-EM | 4-MCH | 2-B | 0.2:0.3:0.5:0.5 | 0.45 | 107 | 112 |

N-MP = N-methylpiperidine
4-EM = 4-ethylmorpholine
4-MCH = 4-methylcyclohexanone
2-B = 2-Butanone The following table 17 summarises the maximum absorbing capacity of the salt recovery solution along with the water recovery and the salts recovery of the different salt recovery solutions containing up to three different amines combined with up to three different ketones. 300 000 ppm NaCl solution was passed through each combination of the salt recovery solution outlined in the following Table 16. The salt and water recovery results listed in this table record one-off tests.

TABLE 17

| A1 | A2 | A3 | K1 | K2 | K3 | Ratio of Amine 1:Amine 2:Amine 3:Ketone 1:Ketone 2:Ketone 3 | Absorption capacity per 5 mL of salt recovery (mL) | Water recovery % | Salts recovery % |
|---|---|---|---|---|---|---|---|---|---|
| TEA | N-MP | 4-EM | 4-MCH | 2-B | CH | 0.3:0.1:0.1:0.4:0.3:0.3 | 0.35 | 88 | 107 |
| TEA | — | — | 4-MCH | 2-B | CH | 0.5:0.4:0.3:0.3 | 0.25 | 120 | 114 |
| — | N-MP | — | 4-MCH | 2-B | CH | 0.5:0.4:0.3:0.3 | 0.35 | 71 | 109 |
| — | — | 4-EM | 4-MCH | 2-B | CH | 0.5:0.4:0.3:0.3 | 0.4 | 110 | 109 |
| TEA | N-MP | — | 4-MCH | 2-B | CH | 0.3:0.2:0.4:0.3:0.3 | 0.25 | 100 | 115 |
| | N-MP | 4-EM | 4-MCH | 2-B | CH | 0.3:0.2:0.4:0.3:0.3 | 0.35 | 86 | 110 |
| TEA | — | 4-EM | 4-MCH | 2-B | CH | 0.3:0.2:0.4:0.3:0.3 | 0.3 | 100 | 113 |

TEA = trimethylamine
N-MP = N-methylpiperidine
4-EM = 4-ethylmorpholine
4-MCH = 4-methylcyclohexanone
CH = cyclohexanone
2-B = 2-Butanone It is to be appreciated that from the results shown in Tables 13 to 17 a variety of combinations of amines and ketones can be used successfully as a salt recovery solution.

Figure 4:
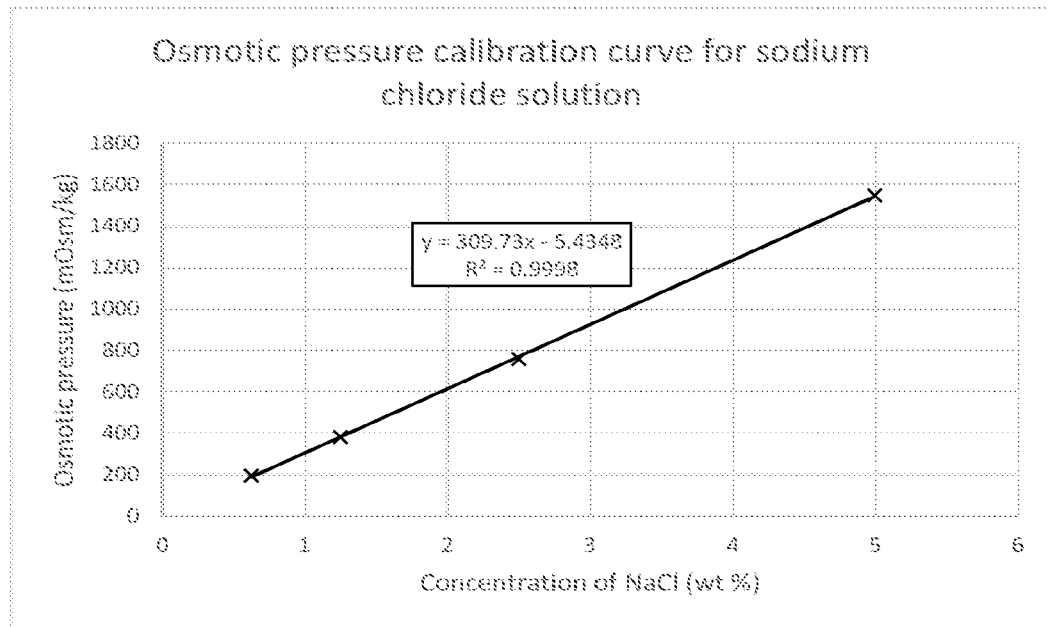
FIG. 4 shows a calibration curve of NaCl solutions against osmotic pressure measurements.

Example 5—Salt Recovery Solution and its Use in Brine Concentration by Way of Water Recovery An initial 5% NaCl solution (w/w) was made up and serial dilutions of 5, 2.5, 1.25 and 0.625% were made from the initial solution. The osmotic pressure of these dilutions was measured, and a calibration curve was plotted as shown in FIG. 4. A trendline equation and R2 value were determined from the calibration plot, as shown on FIG. 4. The equation was used to calculate the unknown concentrations of NaCl after concentrating a brine solution using the salt recovery solution as described below.

Salt recovery solutions were prepared using: Triethylamine (TEA) and methyl ethyl ketone (MEK), N-Ethylpiperidine and cyclohexanone in the molar ratio of 0.5:1.

Figure 5:
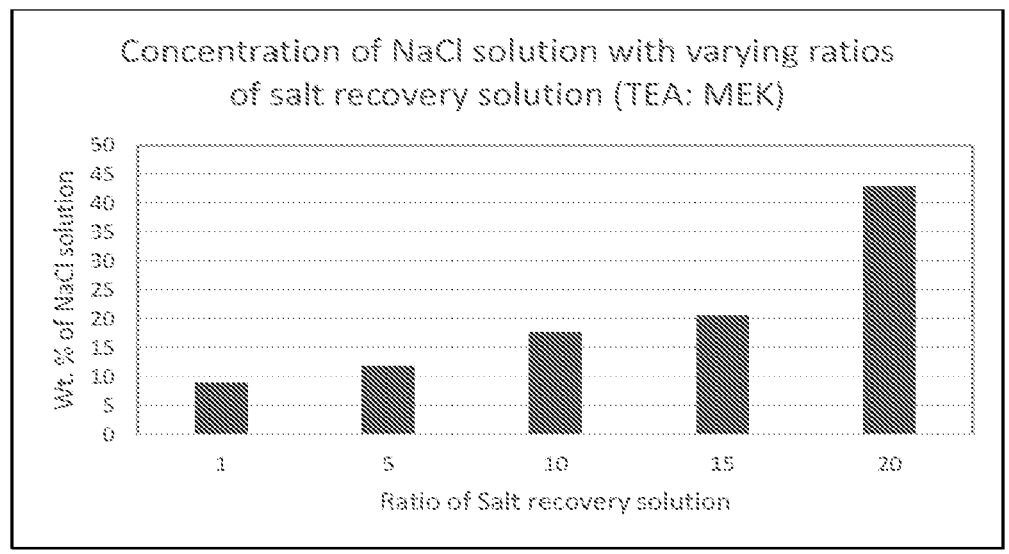
FIG. 5 shows a bar graph of the concentration of NaCl solution after concentration using varying ratios of salt recovery solution (TEA:MEK).
Figure 6:
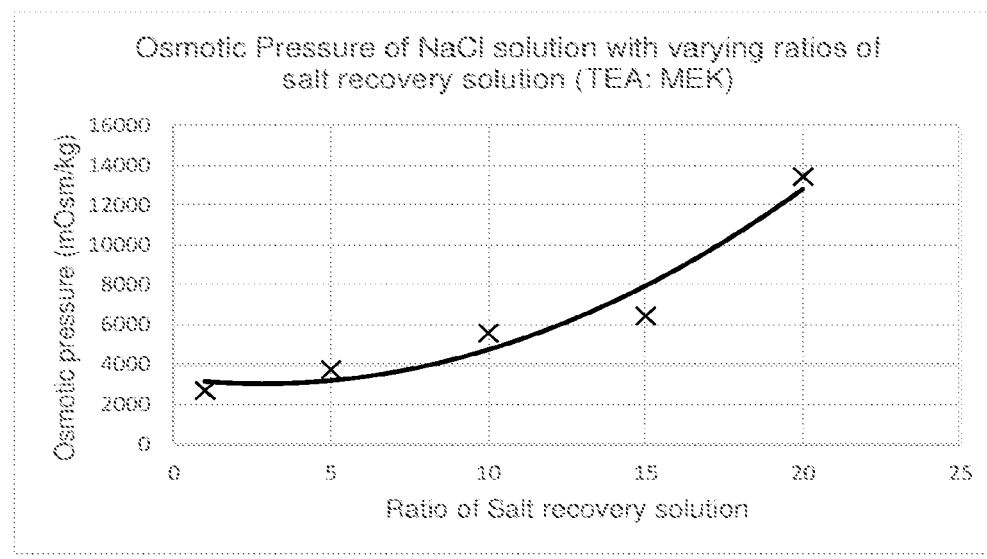
FIG. 6 shows a graph of the osmotic pressure of NaCl solution after concentration using varying ratios of salt recovery solution (TEA:MEK).

1 mL of 5% NaCl brine solution (the initial NaCl solution prepared above) was added to the salt recovery solution in ratios (by vol.) varying from 1:1 to 1:20. These samples separated into two layers. The top layer was salt recovery solution and the bottom layer was concentrated brine. The salt concentration in the aqueous layer increased with varying ratios of the salt recovery solution. The concentrated brine layer was separated, and the NaCl concentration was measured using the osmometer. The results for the TEA:MEK salt recovery solution are tabulated in Table 18 and shown in FIGS. 5 and 6.

TABLE 18

Concentration of NaCl brine after concentrating using salt recovery solution (TEA:MEK).

| Ratio of Brine:Salt recovery solution | Osmotic Pressure (mOsm/kg) | Wt. % NaCl |
|---|---|---|
| 1:1 | 2690 | 9 |
| 1:5 | 3740 | 12 |
| 1:10 | 5570 | 18 |

TABLE 18-continued

Concentration of NaCl brine after concentrating using salt recovery solution (TEA:MEK).

| Ratio of Brine:Salt recovery solution | Osmotic Pressure (mOsm/kg) | Wt. % NaCl |
|---|---|---|
| 1:15 | 6430 | 21 |
| 1:20 | 13430 | 43 |

Figure 7:
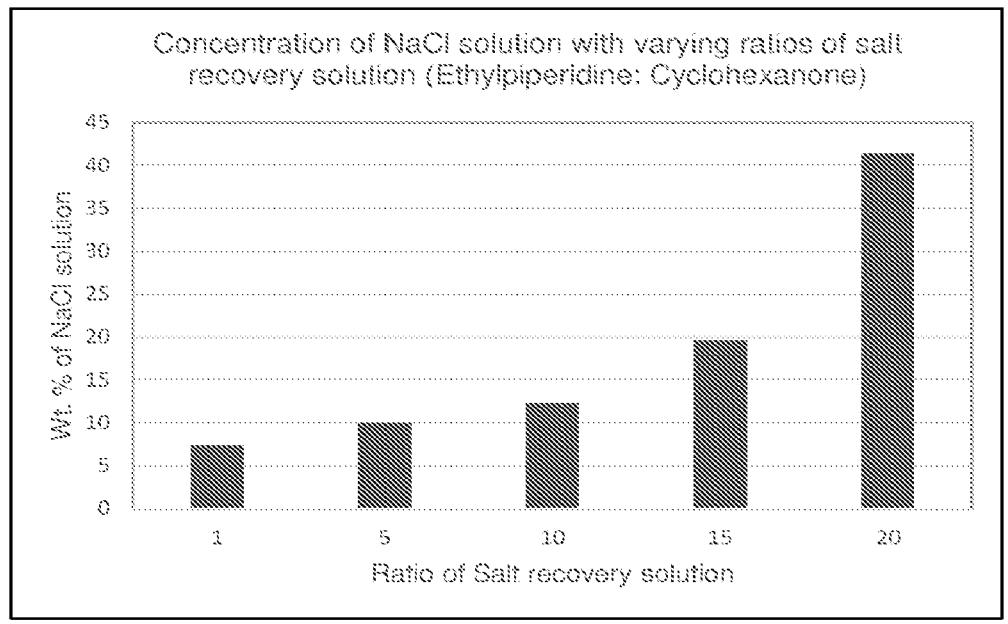
FIG. 7 shows a bar graph of the concentration of NaCl solution after concentration using varying ratios of N-Ethylpiperidine:Cyclohexanone salt recovery solution.
Figure 8:
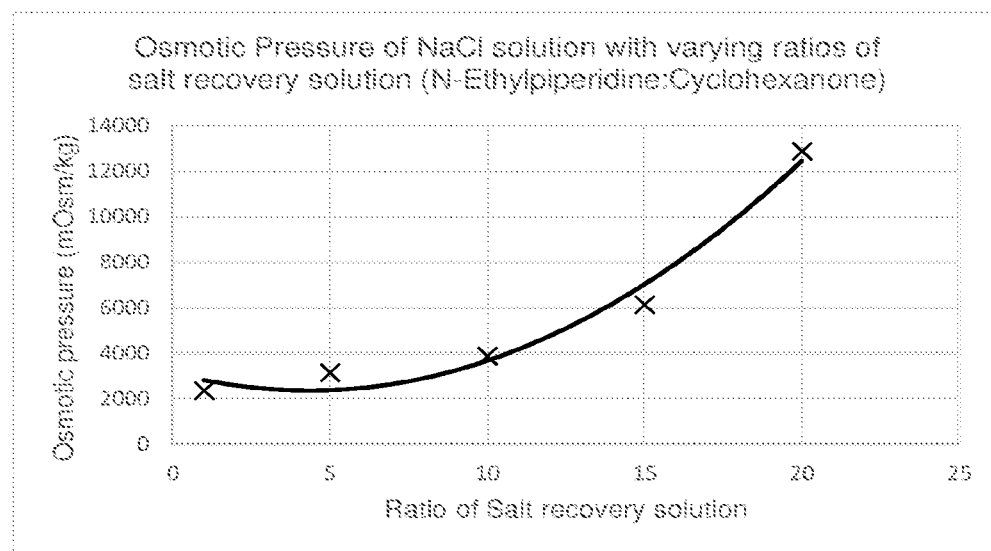
FIG. 8 shows a graph of the osmotic pressure of NaCl solution after concentration using varying ratios of using salt recovery solution (N-Ethylpiperidine:Cyclohexanone).

The results for the N-ethylpiperidine:cyclohexanone salt recovery solution are tabulated in Table 19 and shown in FIGS. 7 and 8.

TABLE 19

Concentration of NaCl brine after concentrating using salt recovery solution (N-Ethlpiperidine: Cyclohexanone).

| Ratio of Brine:Salt recovery solution | Osmotic Pressure (mOsm/kg) | Wt. % NaCl |
|---|---|---|
| 1:1 | 2350 | 7 |
| 1:5 | 3150 | 10 |
| 1:10 | 3870 | 12 |
| 1:15 | 6120 | 20 |
| 1:20 | 12870 | 41 |

The results shown in Tables 18 and 19 and in FIGS. 4-8 show the extent to which the original 5% NaCl solution has been concentrated by the two different salt recovery solutions. Essentially water has been recovered from the initial 5% NaCl solution and the water has moved into the salt recovery solution effectively leading to the concentration of the initial 5% NaCl solution.

Example 6—Salt Recovery Solution and its Use in Brine Concentration by Way of Water Recovery The experiment described in Example 5 was repeated, except the 5% NaCl solution was replaced with a 20% (w/w) ammonium sulfate (NH$_4$SO$_4$) solution.

Figure 9:
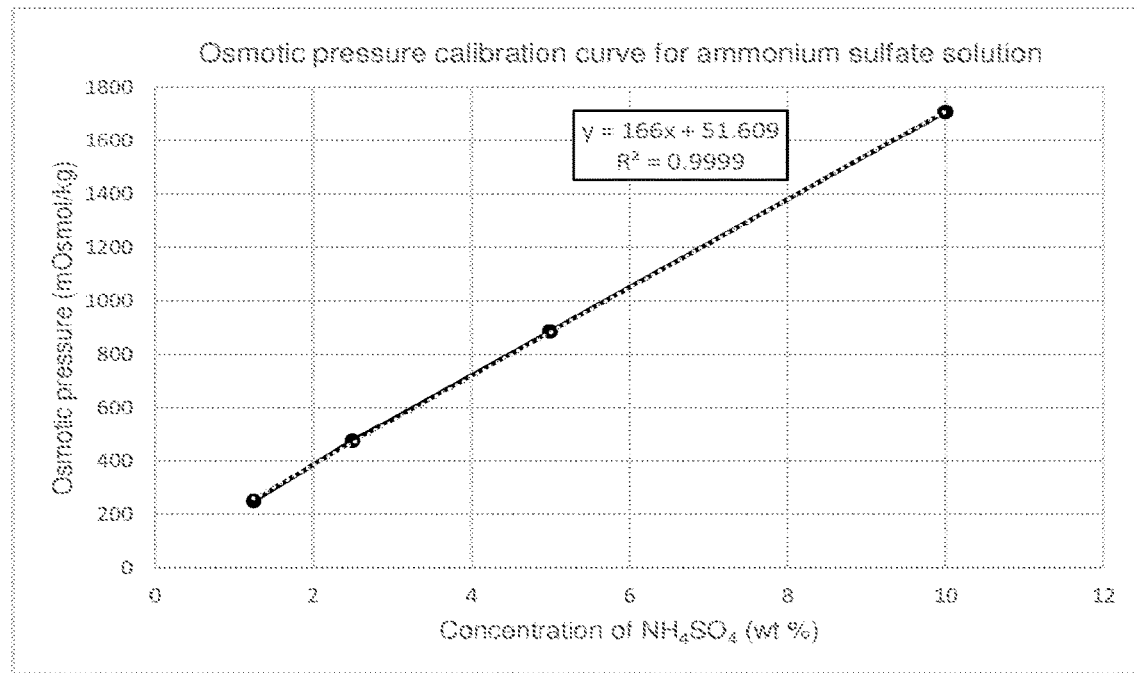
FIG. 9 shows a calibration curve of $NH_4SO_4$ solutions against osmotic pressure measurement.

An initial 20% NH$_4$SO$_4$ solution (w/w) was made up and four standard samples were made from the initial solution. The osmotic pressure of these samples was measured, and a calibration curve was plotted as shown in FIG. 9. A trendline equation and R2 value were determined from the calibration plot, as shown on FIG. 9. The equation was used to calculate the unknown concentrations of NH$_4$SO$_4$ after concentrating a brine solution using the salt recovery solution as described below.

Salt recovery solutions were prepared using: Triethylamine (TEA) and methylethylketone (MEK).

1 mL of 20% NH$_4$SO$_4$ brine solution (the initial 20% NH$_4$SO$_4$ solution prepared above) was added to the salt recovery solution in ratios (by vol.) varying from 1:5 to 1:30. These samples separated into two layers. The top layer was salt recovery solution and the bottom layer was concentrated brine. The salt concentration in the aqueous layer increased with varying ratios of the salt recovery solution. The concentrated brine layer was separated, and the 20% NH$_4$SO$_4$ concentration was measured using the osmometer. The results for the TEA:MEK salt recovery solution are tabulated in Table 20 and shown in FIG. 10.

TABLE 20

Concentration of NH$_4$SO$_4$ brine after concentrating using salt recovery solution (TEA:MEK).

| Ratio of Brine:Salt recovery solution | Osmotic Pressure (mOsm/kg) | Wt. % NH$_4$SO$_4$ |
|---|---|---|
| 1:5 | 5266.96 | 31.42 |
| 1:10 | 5753.01 | 34.35 |
| 1:15 | 6011.97 | 35.91 |
| 1:20 | 6304.80 | 37.67 |
| 1:35 | 6478.10 | 38.71 |

Figure 10:
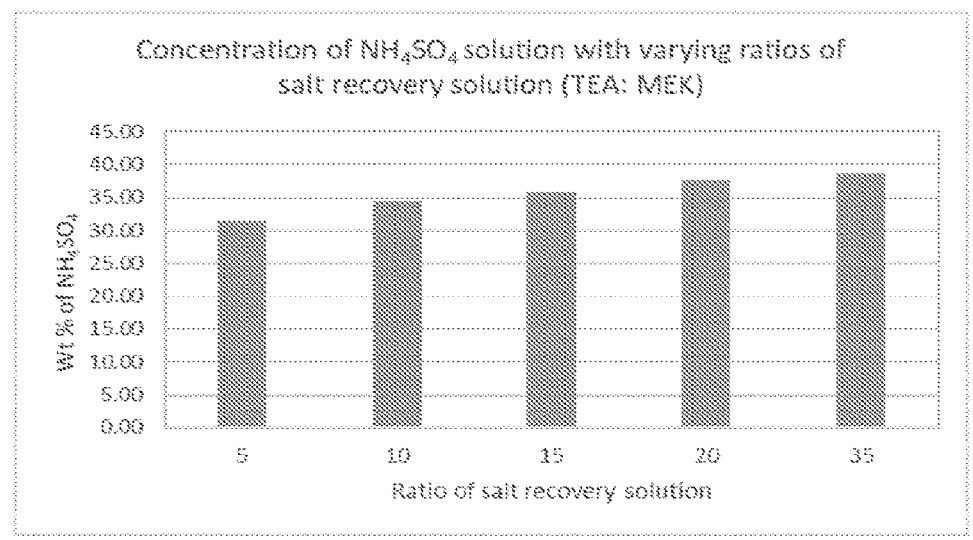
FIG. 10 shows a bar graph of the concentration of $NH_4SO_4$ solution after concentration using varying ratios of salt recovery solution (TEA:MEK).

The results shown in FIG. 10 and Table 20 show that the salt recovery solution (TEA:MEK) is capable of concentrating a salt solution to a higher final concentration. Essentially water has been recovered from the initial NH$_4$SO$_4$ solution and the water has moved into the salt recovery solution effectively leading to the concentration of the initial NH$_4$SO$_4$ solution.

The present invention and its embodiments have been described in detail. However, the scope of the present invention is not intended to be limited to the particular embodiments of any process, manufacture, composition of matter, compounds, means, methods, and/or steps described in the specification. Various modifications, substitutions, and variations can be made to the disclosed material without departing from the spirit and/or essential characteristics of the present invention. Accordingly, one of ordinary skill in the art will readily appreciate from the disclosure that later modifications, substitutions, and/or variations performing substantially the same function or achieving substantially the same result as embodiments described herein may be utilized according to such related embodiments of the present invention. Thus, the following claims are intended to encompass within their scope modifications, substitutions, and variations to combinations, kits, compounds, means, methods, and/or steps disclosed herein.

The invention claimed is:

1. A process for separating a salt from a first aqueous solution, the process comprising the steps of:
   (a) adding the salt containing first aqueous solution to a salt recovery solution comprising:
      (i) at least one tertiary amine containing compound; and
      (ii) at least one enolisable carbonyl; and
   (b) allowing the salt to precipitate on passage through the salt recovery solution wherein wherein the salt containing first aqueous solution is sea water or a brine; and wherein the at least one tertiary amine is selected from selected from:
      (i) 1-ethylpyrrolidine, 2-methylpyridine, N-methylpiperidine, and 4-ethylmorpholine; or
      (ii) a —N(C$_1$-C$_4$ alkyl)$_3$ or
      (iii) —N(C$_2$ alkyl)$_3$ (triethylamine); or
      (iv) is selected from:

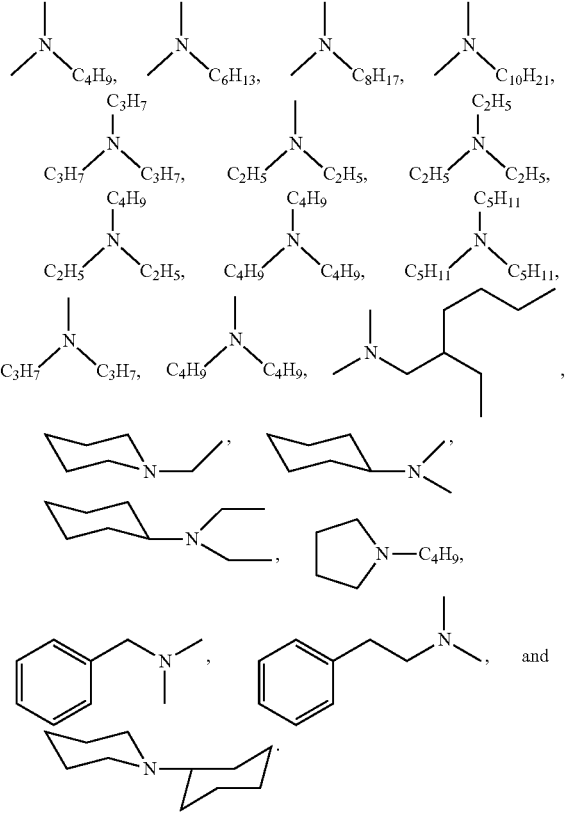

2. The process of claim 1, wherein the process includes the further step of adding an additive to the salt recovery solution to further release water held within the salt recovery solution.

3. The process of claim 2, wherein the additive is citric acid or a citric acid solution.

4. The process of claim 1, wherein the salt recovery solution comprises at least one enolisable carbonyl of Formula I,

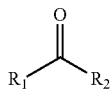

Formula I wherein
- a) $R_1$ and $R_2$ are independently selected from a —$C_1$-$C_7$ alkyl or a —$C_3$-$C_7$ monocyclic; or
- b) one of $R_1$ or $R_2$ is selected from a —O—($C_1$-$C_7$ alkyl) and the other is selected from a —$C_1$-$C_7$ alkyl, or
- c) $R_1$ and $R_2$ together, with the carbonyl of Formula I, form a 3-15 membered monocyclic ketone or a 3-15 membered monocyclic heterocyclic ketone; or
- d) $R_1$ and $R_2$ together with the carbonyl of Formula I form an 8-15 membered aromatic system optionally including one or more heteroatoms selected from S, N or O.

5. The process of claim 1, wherein the salt recovery solution comprises at least one enolisable carbonyl of Formula II,

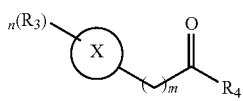

Formula II wherein
- X is a 5-8 membered aromatic monocyclic optionally containing a heteroatom selected from S, N or O;
- each $R_3$, if present, is selected independently from a halo, a hydroxy, a —$NO_2$, a $C_1$-$C_7$ alkyl, or a —O—($C_1$-$C_7$ alkyl);
- $R_4$ is selected from a halo, a —O—($C_1$-$C_7$ alkyl); a $C_1$-$C_7$ alkyl optionally substituted with a halo, a hydroxy, a —O—($C_1$-$C_7$ alkyl) or a $C_3$-$C_7$ monocyclic; or a $C_3$-$C_7$ monocyclic optionally substituted with a halo, a hydroxy, a $C_1$-$C_7$ alkyl, or a —O—($C_1$-$C_7$ alkyl);
- m is 0, 1, 2 or 3 carbons, each carbon being optionally substituted with one or more substituents selected from a halo, hydroxy, a $C_1$-$C_7$ alkyl optionally substituted with a halo or a hydroxy; a $C_1$-$C_7$ alkyl, a —O—($C_1$-$C_7$ alkyl) or a $C_3$-$C_7$ monocyclic; and
- n is 0, 1, 2 or 3.

6. The process of claim 4, wherein the salt recovery solution comprises a combination of more than one enolisable carbonyl of Formula I.

7. The process of claim 5, wherein the salt recovery solution comprises a combination of more than one enolisable carbonyl of Formula I and Formula II.

8. The process of claim 1, wherein the at least one tertiary amine containing compound to the one or more enolisable carbonyls are present
- (i) in a molar ratio of about 1:99 or 99:1; or
- (ii) in a molar ratio of about 1:50 or 50:1; or
- (iii) in a molar ratio of about 1:10 or 10:1; or
- (iv) in a molar ratio of about 1:5 or 5:1; or
- (v) in a molar ratio of about 1:3 or 3:1; or
- (vi) in a molar ratio of about 1:2 or 2:1; or
- (vii) in a molar ratio of about 1:1.

9. The process of claim 4, wherein $R_1$ and $R_2$ of Formula I are independently selected from a —$C_1$-$C_7$ alkyl, preferably methyl and ethyl.

10. The process of claim 1, wherein the salt recovery solution is recycled for use in a further separation process.

11. The process of claim 1, wherein the process is a continuous process.

* * * * *